(12) United States Patent
Badawy

(10) Patent No.: US 7,986,810 B2
(45) Date of Patent: Jul. 26, 2011

(54) MESH BASED FRAME PROCESSING AND APPLICATIONS

(75) Inventor: Wael Badawy, Calgary (CA)

(73) Assignee: Intelliview Technologies Inc., Calgary, Alberta (CA)

( * ) Notice: Subject to any disclaimer, the term of this patent is extended or adjusted under 35 U.S.C. 154(b) by 0 days.

(21) Appl. No.: 12/573,128

(22) Filed: Oct. 4, 2009

(65) Prior Publication Data

US 2010/0086050 A1    Apr. 8, 2010

Related U.S. Application Data

(62) Division of application No. 10/840,433, filed on May 7, 2004, now Pat. No. 7,616,782.

(51) Int. Cl.
 *G06K 9/00* (2006.01)
(52) U.S. Cl. ........ 382/103; 382/104; 382/107; 382/241; 382/254
(58) Field of Classification Search .................. 382/103, 382/104, 107, 241, 254
See application file for complete search history.

(56) References Cited

U.S. PATENT DOCUMENTS 6,366,701 B1 *   4/2002   Chalom et al. ................ 382/236
* cited by examiner

*Primary Examiner* — Tom Y Lu
(74) *Attorney, Agent, or Firm* — Anthony R. Lambert

(57) ABSTRACT

A method of processing sequential frames of data comprises repeating the following steps for successive frames of data: acquiring at least a reference frame containing data points and a current frame of data points; identifying a set of anchor points in the reference frame; assigning to each anchor point in the reference frame a respective motion vector that estimates the location of the anchor point in the current frame; defining polygons formed of anchor points in the reference frame, each polygon containing data points in the reference frame, each polygon and each data point contained within the polygon having a predicted location in the current frame based on the motion vectors assigned to anchor points in the polygon; for one or more polygons in the reference frame, adjusting the number of anchor points in the reference frame based on accuracy of the predicted locations of data points in the current frame; and if the number of anchor points is increased by addition of new anchor points, then assigning motion vectors to the new anchor points that estimate the location of the anchor points in the current frame.

6 Claims, 16 Drawing Sheets

● Nodes at level0     ○ Nodes at level1

(1)

(2)

(3)

(4)

(a) Frame 1          (b) Frame 2

MESH BASED FRAME PROCESSING AND APPLICATIONS

CROSS-REFERENCE TO RELATED APPLICATIONS

This application is a divisional of U.S. patent application Ser. No. 10/840,433, filed May 7, 2004 and published as United States patent publication no. 2005/0249426.

BACKGROUND OF THE INVENTION

The recent advance in the field of communication-based applications such as videophone and video conferencing systems mainly concentrate on minimizing the size and the cost of the coding equipment. The low cost of the final product is the most essential part of the current age of technology. Most current real-time systems include video applications that need to process huge amounts of data and large communication bandwidth. Real-time video applications include strategies to compress the data into a feasible size.

Among different data compression techniques, object-based video representation, as addressed by MPEG-4, allows for content-based authoring, coding, distribution, search and manipulation of video data. In MPEG-4, the Video Object (VO) refers to spatio-temporal data pertinent to a semantically meaningful part of the video. A 2-D snapshot of a Video Object is referred to as a Video Object Plan (VOP). The 2-D triangular mesh is designed on the first appearance of VOP as extension for the 3D modeling. The vertices of the triangular patches are referred to as the nodes. The nodes of the initial mesh are then tracked from VOP to VOP. Therefore, the motion vectors of the node points in the mesh represent the 2D motion of each VO. The motion compensation is achieved by triangle wrapping from VOP to VOP using Affine transform.

Recently, hierarchical mesh representation attracted attention because it provides rendering at various levels of detail. It also allows scalable/progressive transmission of the mesh geometry and motion vectors. The hierarchical mesh coding is used for transmission scalability where we can code the mesh at different resolutions to satisfy the bandwidth constraints and/or the QoS requirements.

Hierarchical 2D-mesh based modeling of video sources has been previously addressed for the case of uniform topology only. The mesh is defined for coarse-to-fine hierarchy, which was trivially achieved by subdividing each triangle/quadrangle into three or four subtriangles or quadrangles, as in C. L. Huang and C.-Y. Hsu, "A new motion compensation method for image sequence coding using hierarchical grid interpolation:" *IEEE Trans. Circuits. Syst Video Technol.*, vol 4, pp. 42-51, February 1994.

A basic requirement of active tracking system is the ability to fixate or track video objects using an active camera. Real-time object tracking systems have been developed recently. T. Darrel's system combines stereo, color, and face detection modules into a single robust system. Pfinder (person finder) uses a multi-class statistical model of color and shape to obtain a 2-D representation of head and hands in a wide range of viewing conditions. KidRooms is a tracking system based on closed-world regions, where regions of space and time in which the specific context of what is in the regions is assumed to be known. These regions are tracked in real-time domains where object motions are not smooth or rigid, and where multiple objects are interacting. Multivariate Gaussian models are applied to find the most likely match of human subjects between consecutive frames taken by cameras mounted in various locations. Lipton's system extracts moving targets from a real-time video stream, classifies them into pre-defined categories and tracks them. Because it uses correlation matching, it is primarily targeted at the tracking of rigid objects. Birchfield proposed an algorithm for tracking a person's head by modeling the head as an ellipse whose position and size are continually updated by a local search combining the output of a module concentrating on the intensity gradient around the ellipse's perimeter, and another module focusing on the color histogram of the ellipse's interior. Reid and Murry introduced monocular fixation using affine transfer as a way of a cluster of such features, while at the same time respecting the transient nature of the individual features.

Mesh based frame processing is disclosed and discussed in papers by Badawy, one of the inventors of this invention, in "A low power VLSI architecture for mesh-based video motion tracking" Badawy, W.; Bayoumi, M. A. IEEE Transactions on Circuits and Systems II: Analog and Digital Signal Processing, Volume 49, Issue 7, pp 488-504, July 2002; and also in "On Minimizing Hierarchical Mesh Coding Overhead: (HASM) Hierarchical Adaptive Structured Mesh Approach", Badawy, W., and Bayoumi, M., Proc. IEEE Int. Conf. Acoustics, Speech and Signal Processing, Istanbul, Turkey, June 2000, p. 1923-1926; and "Algorithm Based Low Power VLSI Architecture for 2-D mesh Video-Object Motion Tracking", IEEE Transactions on Circuits and Systems for Video Technology, vol. 12, no. 4, April 2002. The present invention is directed towards an improvement over the technology disclosed in Badawy papers.

Coding of frame data requires a motion detection kernel. Perhaps, the most popular motion estimation kernel used for inter-frame video compression is the block matching model. This model is often more preferred over others in video codec implementations, because it does not involve complicated arithmetic operations as compared to other kernels such as the optical flow model. However, the block matching model has major limitations in the accuracy of estimated motion, since it only allows inter-frame dynamics to be described as a series of block translations. As a result, any inter-frame dynamics related to the reshaping of video objects will be inaccurately represented.

The mesh-based motion analysis as disclosed by Badawy addresses the shortcomings of block matching. In this model, an affine transform procedure is used to describe inter-frame dynamics, so that the reshaping of objects between video frames can be accounted for and the accuracy of estimated motion can be improved. Since this model also does not require the use of complicated arithmetic procedures, it has attracted many developers to use it as a replacement for the block matching model in inter-frame codec implementations. Indeed, MPEG-4 has included the mesh-based motion analysis model as part of its standard.

The efficacy of the mesh-based motion analysis model, even with the improvements disclosed in this patent document, is often limited by the domain disparity between the affine transform function and the pel domain. In particular, since the affine transform is a continuous mapping function while the pel domain is discrete in nature, a discretization error will result when the affine transform is applied to the pel domain. As pel values are not uniformly distributed in a video frame, a minor discretization error may lead to totally incorrect pel value mappings. Hence, the quality of frames reconstructed by the mesh-based motion analysis model is often affected. The poor frame reconstruction quality problem becomes even more prominent at the latter frames of a group-of-pictures (GOP), since these latter frames are reconstructed with earlier reconstructed frames in the same GOP and thus all prior losses in the frame reconstruction quality are carried over.

To resolve the frame reconstruction quality problem in the mesh-based motion analysis model, residual coding techniques can be employed. These techniques provide Discrete Cosine Transform (DCT) encoding of the prediction difference between the original frame and the reconstructed frame, and thus better frame reconstruction quality can be achieved. However, the use of these techniques will reduce the compression efficiency of the video sequence, since residual coding will bring about a significant increase in the compressed data stream size. To this end, residual coding via the matching pursuit technique may be used instead. This approach offers high quality residual coding with very short amendments to the compressed data stream. Nevertheless, it is not a feasible coding solution as yet because of its high computational power requirements.

SUMMARY OF THE INVENTION

According to an aspect of the invention, there is proposed a novel mesh based frame processing technology. According to a further aspect of the invention, a structure in a frame is divided based on its dynamics. This approach generates a content-based mesh and optimizes the overhead of sending the mesh's geometry. The motion estimation for the node is based on any motion estimation technique (i.e. optical flow, pel recursive, Block-based matching) It generates Affine mapping coefficients, for each triangular patch. It uses them to transform corresponding patches from the previous frame to the predicted frame.

The proposed methods generate a content-based structure, which uses a small number of bits to describe the structure and its dynamics. The structure construction is from coarse to fine. It initiates anchor points with polygonal topology. It performs a successive dividing depending on the contents of the object. Moreover, it produces the binary code for the structure, which can be used to reconstruct the structure without sending the anchor' locations.

An aspect of the invention includes a motion-based object detection and tracking algorithm. According to this aspect of the invention, a method of processing a frame of date involves extracting object feature points (tracking points) and constructing an affine-based model to predict the size and position of an object during the tracking process. Affine models are zoom invariant, which makes it possible to track an object with changing size and shape. Compared to traditional frame difference and optical flow methods, the proposed algorithm largely reduces the computational cost because it explores only relevant object feature points and it processes smaller number of points instead of the full frame. Moreover, it is more accurate since affine transformation is viewpoint invariant.

According to a further aspect of the invention, the proposed algorithm includes 3 main stages. The first 2 stages detect the object feature or tracking points and locates a set of object feature points that represents the vide object. The extracted object feature points will be tracked in the subsequent video frames. Motion-based object segmentation methods may be used together with feature detector to avoid the influence of the background noise. Objects may be detected using temporal difference and an object boundary box (OBB) can be located. The coordinates of the OBB may be recorded and used for OBB reconstruction in the consequent frames to predict the changing size and position of the moving object. In the second stage, affine basis points are selected from the detected object feature points. An affine model is built, and used to predict the OBB points in order to get the size and location of the video object.

There is therefore provided, according to an aspect of the invention, a method of processing sequential frames of data. The method in this aspect comprises repeating the following steps for successive frames of data: acquiring at least a reference frame containing data points and a current frame of data points; identifying a set of anchor points in the reference frame; assigning to each anchor point in the reference frame a respective motion vector that estimates the location of the anchor point in the current frame; and defining polygons formed of anchor points in the reference frame. According to another aspect of the invention, for one or more polygons in the reference frame, adjusting the number of anchor points in the reference frame. If the number of anchor points is increased by addition of new anchor points, then assigning motion vectors to the new anchor points that estimate the location of the anchor points in the current frame. Each polygon may contain data points in the reference frame, where each polygon and each data point contained within the polygon has a predicted location in the current frame based on the motion vectors assigned to anchor points in the polygon. Each polygon may be defined by at least four anchor points. The distribution of anchor points may be based on the texture of the reference frame. The number of anchor points may be adjusted based on accuracy of the predicted locations of data points in the current frame, where the adjustment of the number of anchor points may be repeated until accuracy of the predicted location is below an accuracy threshold or until a stop measure based on anchor point density or on the number of repetitions of the adjustment of the number of anchor points is achieved. Adjusting the number of anchor points in a polygon is based at least in part on accuracy of predicted locations of data points in neighboring polygons, may comprise adding or removing a number of anchor points and may depend on the magnitude of the error measure. Polygons may be processed in a sequential order that tends to maximize the number of neighboring polygons already processed when any given polygon is processed. The processing of successive frames may be stopped due to an artifact, and re-started with a carry-over of an anchor point distribution from a frame processed before the processing was stopped According to an aspect of the invention, the accuracy of the predicted location of the data points in the current frame is estimated by finding an error measure and comparing the error measure to an error measure threshold. The error measure may be a function of the difference between the predicted location of the data points in the current frame and the actual location of the data points in the current frame.

According to an aspect of the invention, the method is carried out as part of a method of data compression, a method of video surveillance, a method of motion detection in successive frames of video data, a method of object analysis in successive frames of video data, object tracking, monitoring the movement, or object identification, which may be based on the size of the object as defined by the tracking points. Object analysis may comprise assigning tracking points to an object in the successive frames of video data, where at least three tracking points may be assigned to the object, and motion vectors found that correspond to the tracking points. The velocity of the object may be calculated from the motion vectors corresponding to the tracking points. The tracking points may be allocated around the boundary of the object, such as at corners if the boundary is rectangular. Unusual conditions may be identified by object size approaching or equaling frame size.

According to a further aspect of the invention, there is provided an apparatus for carrying out the methods of the invention, comprising a video camera for acquiring successive frames of data and a data processor for processing the successive frames of data.

According to a further aspect of the invention, there is provided a method of processing a frame of data, the method comprising the steps of: dividing the frame of data into cells; and processing the cells according to an order that preserves the proximity of the processed cells, such that neighboring cells are processed in close sequence to each other.

According to a further aspect of the invention, a frame of data is coded by multiple techniques with interleaved bitstreams, each bit stream being coded using a different approach.

These and other aspects of the invention are set out in the claims, which are incorporated here by reference.

BRIEF DESCRIPTION OF THE DRAWINGS

Preferred embodiments of the invention will now be described with reference to the figures, in which like reference characters denote like elements, by way of example, and in which.

DETAILED DESCRIPTION OF PREFERRED EMBODIMENTS

The proposed approach constructs a mesh topology on a frame. The construction of the mesh relies on the motion of the video object. Thus the motion boundary of the object can be obtained directly from the mesh topology.

The Mesh Generation

The proposed technique constructs a mesh topology using both coarse-to-fine and fine-to-coarse techniques. The former refers to subdivision of larger patches into smaller polygons while the latter refers to the merging of smaller patches into larger polygons. Consequently, it captures the dynamics of video sequences. The coarse-to-fine structure is generated by gradually increasing the number of anchors based on an error function less than error threshold. The addition of the anchors uses adaptive successive splitting. The method codes the splitting instead of the nodes themselves which saves more bits.

Figure 1:
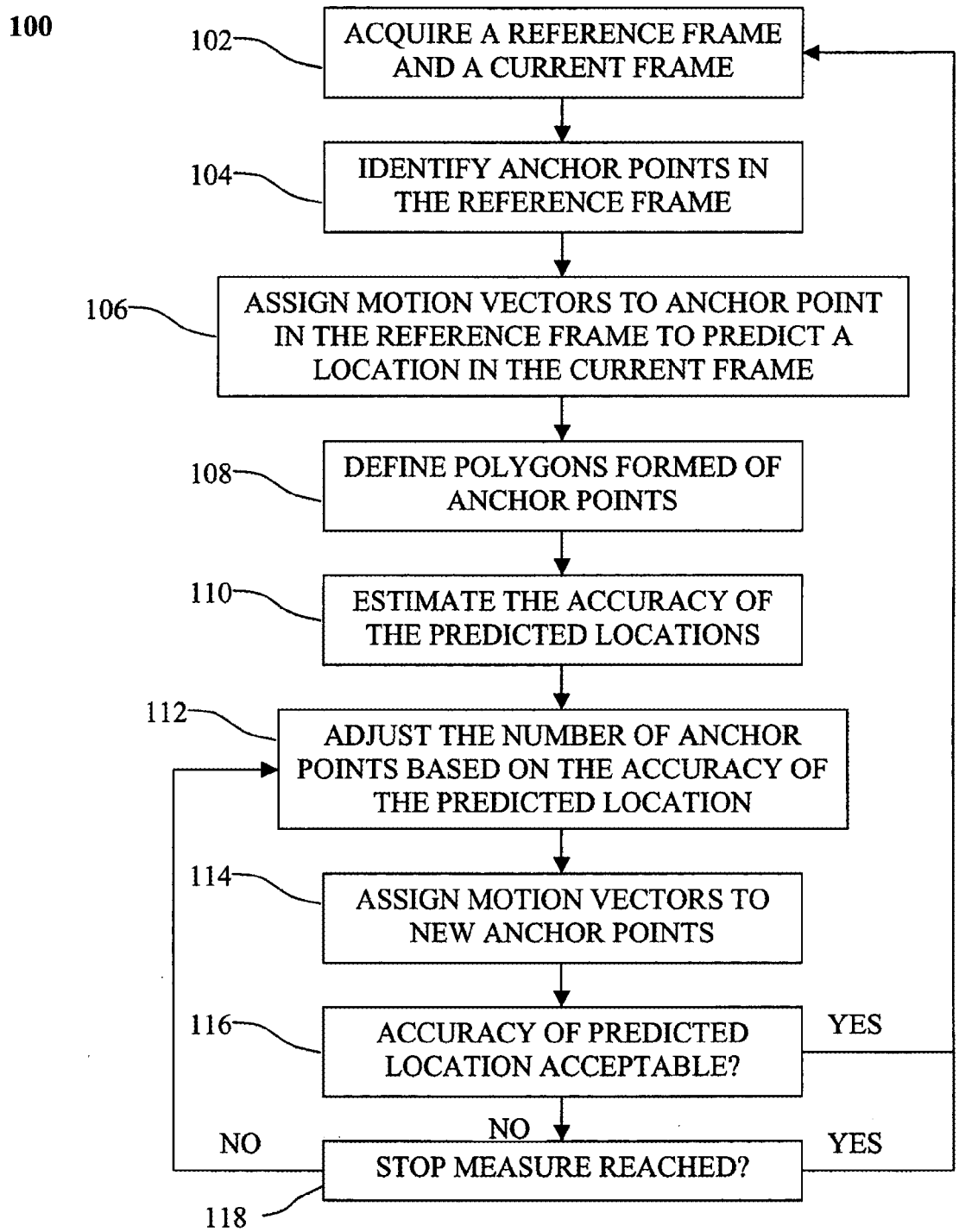
FIG. 1 is a flow diagram showing a method of generating a mesh.

A description of the present invention will now be given with reference to FIG. 1, which shows a method 100 of processing sequential frames of data, the steps of which are repeated for successive frames of data. In step 102, a reference frame containing data points and a current frame of data points are acquired. In step 104, a set of anchor points in the reference frame are identified. Depending on the situation, the distribution of anchor points may be based on the texture of the reference frame. A motion vector is assigned to each anchor point in the reference frame that estimates the location of the anchor point in the current frame in step 106, and polygons are formed from the anchor points in step 108, where each polygon contains data points in the reference frame. Each polygon is defined by at least four anchor points. Also, each polygon and each data point contained within the polygon have a predicted location in the current frame based on the motion vectors assigned to anchor points in the polygon. In step 110, the accuracy of the predicted locations is estimated. This is done by finding an error measure, which is a function of the difference between the predicted location of the data points in the current frame and the actual location of the data points in the current frame, and comparing the error measure to an error measure threshold. In step 112, for one or more polygons in the reference frame, the number of anchor points in the reference frame is adjusted by adding or removing a number of anchor points based on the accuracy of the predicted locations of data points in the current frame, or on the magnitude of the error measure. The number of anchor points in a polygon may be adjusted by using the accuracy of predicted locations of data points in neighboring polygons, such that polygons are processed in a sequential order that tends to maximize the number of neighboring polygons already processed when any given polygon is processed. If the number of anchor points is increased by addition of new anchor points, then motion vectors are assigned to the new anchor points that estimate the location of the anchor points in the current frame in step 114. If the accuracy of the predicted locations for each anchor point is below an accuracy threshold in step 116, then the process returns to step 102, and another reference frame and current frame are acquired. The previous current frame then becomes the new reference frame in the repetition. If, however, processing of successive frames is stopped due to an artifact, then it can be re-started with a carry-over of an anchor point distribution from a frame processed before the processing was stopped. If the accuracy of the predicted locations is not below the accuracy threshold, the number of anchor points is adjusted until the predicted locations are below the threshold, or until a stop measure is reached. The stop measure may be a maximum number of repetitions of the adjustment of the number of anchor points, or it may also be a limit on the density of anchor points.

The method described above is useful as part of a method of data compression, or motion detection and object analysis in successive frames of video data. Motion detection, such as for video surveillance, and object analysis, such as object tracking or identification, will be described in more detail below.

Figure 2:
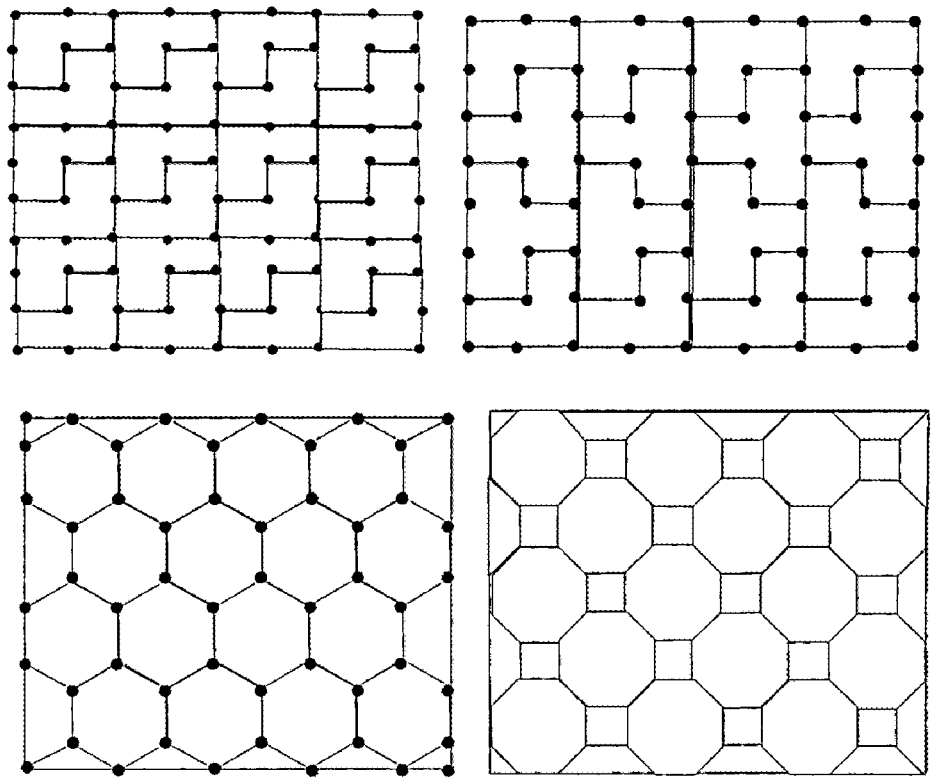
FIG. 2 shows examples of polygonal topologies for level0.

The mesh topology is generated through a split/merge procedure. This procedure begins with an initial mesh (uniform or any other mesh) at a resolution r, where the white nodes represent the nodes of the mesh. The method initiates the topology as a distribution of anchors and polygonal topology as shown in FIG. 2. In FIG. 2 the structure, at level0, is represented as polygonal patches with type $t_0$ and resolution r, where r is the size of the patch. Each patch is divided according to a splitting criterion into smaller polygons. The split procedure will stop when the maximum level $l_{max}$ is reached or the splitting criterion is satisfied.

Figure 3:
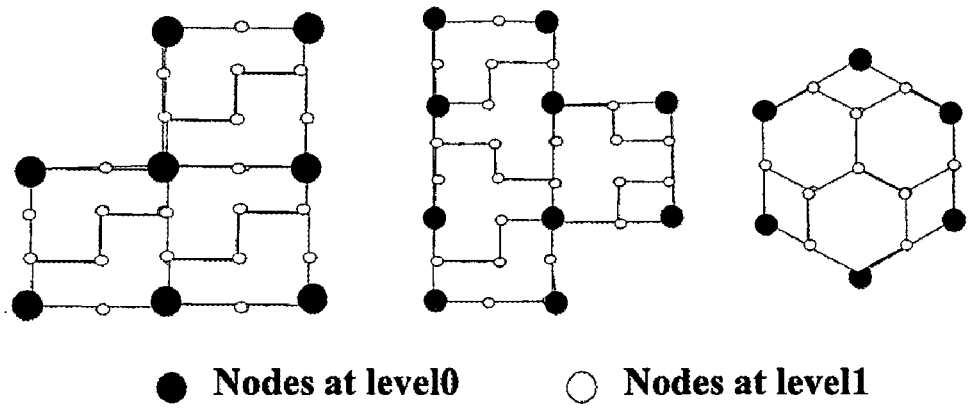
FIG. 3 shows examples of level0 split into smaller polygons.
Figure 4:
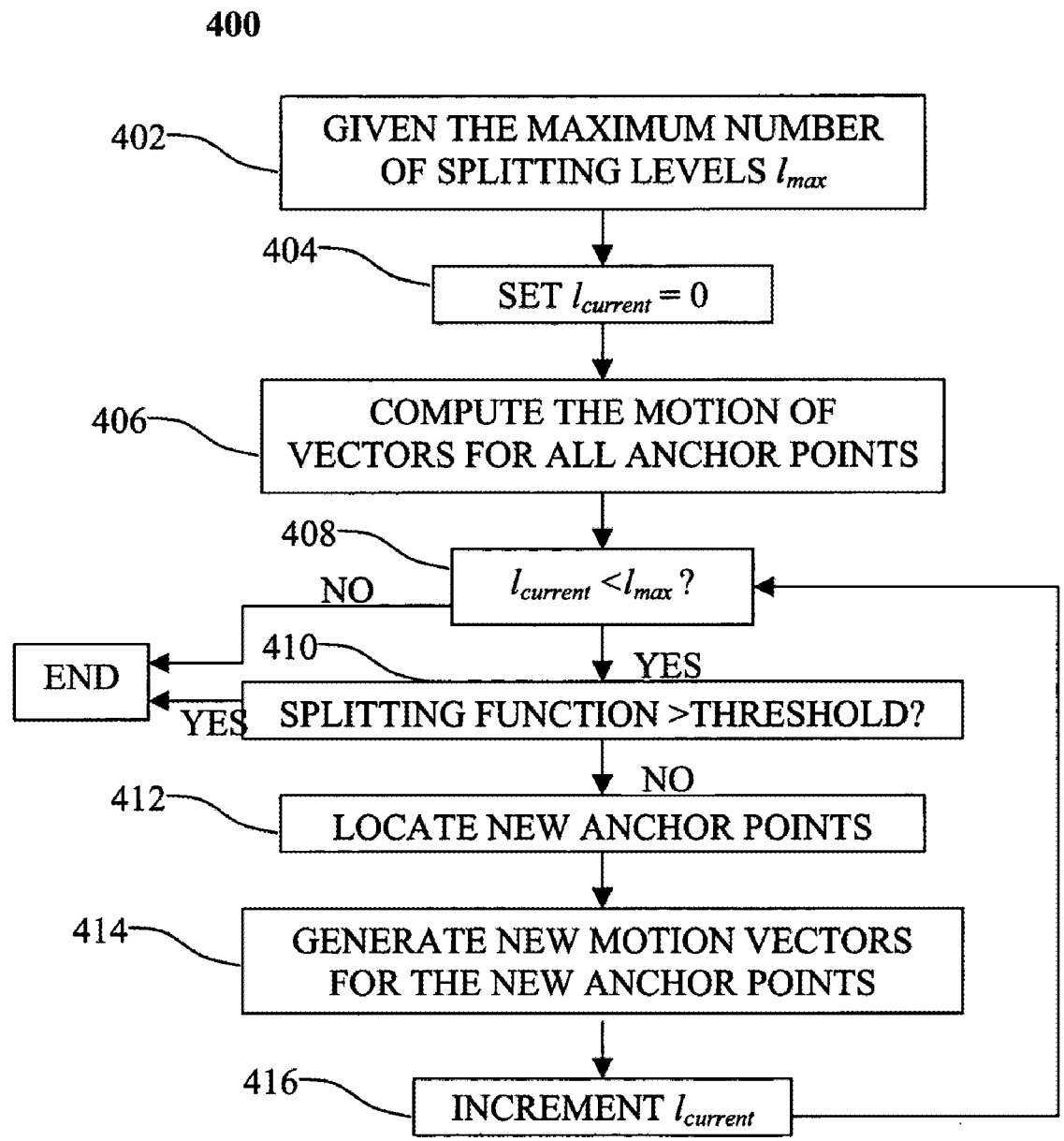
FIG. 4 is a flow diagram showing an algorithm for generating a mesh topology.

Referring now to FIG. 3, at level1 each polygonal patch is divided into n smaller polygons according to a certain splitting criterion. The algorithm 200 for generating the topology is shown in FIG. 4. In step 402, the maximum number of splitting levels $l_{max}$ is specified, and $l_{current}$ is reset to 0 in step 404. The motion of vectors is computed for all anchor points in step 406. In step 408, we test whether $l_{current} < l_{max}$. If this is false, the algorithm ends. If true, then we continue to step 410, where we test whether the error measure is less than the threshold. If false, the algorithm ends. If not, we continue to step 412, where new anchor points are located, and corresponding motion vectors are calculated in step 414. $l_{current}$ is incremented in step 416, and we return to step 408. This splitting operation adds m new anchors to the current polygon. We repeat this operation for each polygon until we reach the maximum level $l_{max}$, or until the error measure is below the error measure threshold.

At this stage, each polygon in the reference frame is defined by a set of anchor points. Each anchor point has a motion vector assigned to it. Using the motion vector assigned to each anchor point, a predicted location of each anchor point may be computed in the current frame. A set of anchor points in the current frame will then form a polygon in the current frame. The error measure, which is used to decide whether to continue forming anchor points (splitting) by comparison with an error measure threshold, is a sum of the absolute difference of data points in the patch in the reference frame and the predicted patch. This is a sum of the absolute difference between the pixel values (data points) of pixels actually in the predicted polygon in the current frame and pixel values (data points) of the pixels in the polygon in the reference frame. The greater the error in the motion vector, the greater the absolute difference is likely to be, since the object represented by the polygon will not be in the expected position. Since greater errors in the motion vector correspond to greater motion, a greater density of anchor points will be obtained for areas of greater motion, ie along the boundary of a fast moving object.

Figure 5:
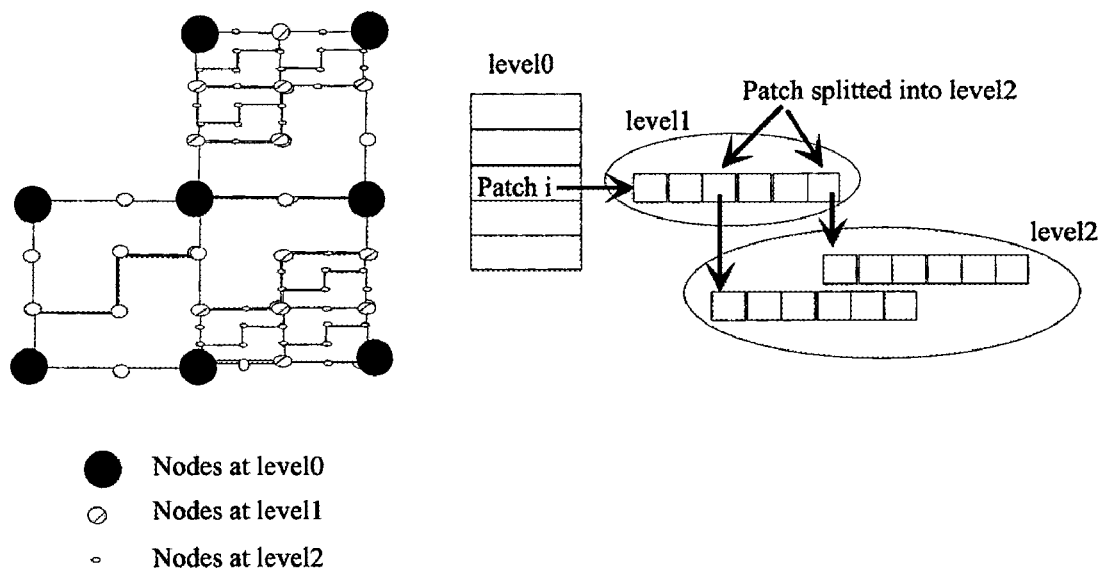
FIG. 5 shows an example of a patch and its representation.

In the proposed approach each polygon has n nodes in general and is generated using a top-down strategy. FIG. 5 shows the structure construction which starts at level0 split into polygons with respect to the splitting criterion. FIG. 5 also shows the mesh at level0, level1 and level2.

Figure 6:
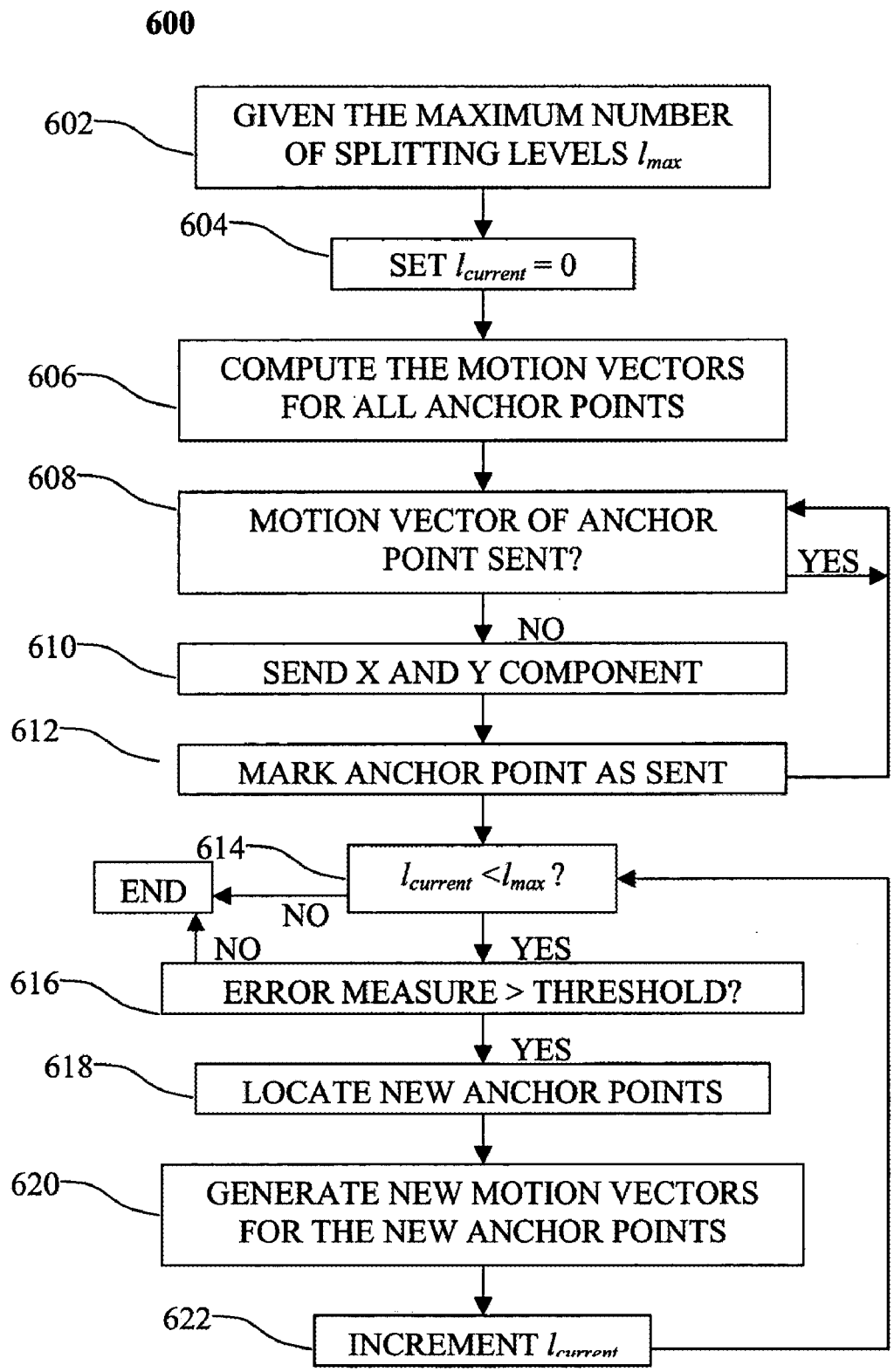
FIG. 6 is a flow diagram showing an algorithm for coding and generating motion vectors.

In the present embodiment, as shown in FIG. 5, the mesh is coded using a sequence of graphs, where each graph represents the structure within a polygon. Each node in the graph represents whether there is a split or not, and each node can be associated with motion vectors. The description of the code follows. At level0, only the resolution r and polygon type p are transmitted associated with the sequence of the motion vectors. In this sequence the decoder can predict the frame as soon as the first set of nodes arrives. For each polygon, the structure is coded based on structure where each node indicates whether a split exists or not. FIG. 6 shows the coding algorithm 600 that decides whether the motion vector will be sent or not. Before beginning the algorithm, the motion vectors for level0 are transmitted. Then, for each patch, we define the maximum number of levels $l_{max}$ in step 602, in step 604, $l_{current}$ is reset to 0, and in step 606 the motion vectors for all anchor points are computed. Then, for each anchor, we repeat step 608 to 612, which queries whether the motion vector of an anchor point has been sent. If not, the X and Y components are sent, and the anchor point is marked as sent. If it has been sent, the algorithm moves to the next anchor point. The rest of the algorithm is similar to that described in FIG. 4. Algorithm 600 is repeated for each patch.

The splitting criterion defines the distribution of the new anchors based on the dynamic components in the neighbor polygons and the dynamic components of the polygon in the previous images. The splitting criterion is a weighting function of the neighbor polygons and the polygon in the previous frames. To maximize the number of the neighbor the polygonal patches should be processed in an order other than the row major order. Various processing orders are described below in relation to FIGS. 21-24.

Object Formation Methodology

An object formation methodology may be used to refine the mesh. According to a threshold criterion, patches with significant motion components, or vectors, are further divided into n smaller sized patches. The split will select the location of the new nodes (anchor points) based on the distribution of the neighbor patches as well as the content of the current patches. For example if two out of the three neighbor-patches have more motion component, the distribution of the new nodes will be more dense near the two patches and fewer close to the third. Other patches that have similar motion parameters are marked together to form a level of dynamics. This procedure is carried out recursively until the splitting criterion is satisfied or no further division is possible, i.e. loss of resolution because of the smallest size of a patch. The detailed description of the split/merge procedure was described with reference to FIG. 1.

Motion Estimation of Mesh Node

Motion estimation is very important for video analysis such as model-based video representation, object tracking, robot navigation, etc. Motion estimation algorithms rely on the fundamental idea that the luminance (I) of a point P(x,y) on a moving object remains constant along P's motion trajectory, i.e., represented as $$I((x,y); t) = I((x+\Delta x, y+\Delta y); t+\Delta t) \quad (1)$$

where $\Delta x$ and $\Delta y$ denote the motion of point P.

To estimate anchor point motion, various conventional motion detection methods may be used such as the Block Matching (BM) technique. The BM is considered as the most practical method for motion estimation due to its lesser hardware complexity. As a result, it is widely available in VLSI, and almost all H.261 and MPEG 1-2 coders utilize BM for motion estimation. In the BM, the displacement for a pixel $P_{ij}$ in a frame i (current frame) is determined by considering an N×N block centered about (i, j), and searching the frame i+1 (Search frame) for the location of the best matching block of the same size. The search is usually limited to a window in order to enhance the performance of the BM.

Block Matching Algorithms (BMA) differ between algorithms in the matching criteria, the search strategy and the block size. In this embodiment, motion vectors (MV) of the anchor points are estimated by generating an 8×8 or 16×16 block of pixels around the point. Then the block-matching procedure is applied to estimate the motion vector for each node, or for the block as a whole. The technique may incorporate a conventional search criterion such as Three Step Search (TSS) and a conventional matching criterion such as Minimum Sum Absolute Difference (SAD). It will be understood that, as this method is a general technique, any search or matching criterion can be used.

Object Extraction

A threshold scheme is incorporated in the algorithm to remove the noise of the image sequence and remain the apparent motion. The value of the threshold ($T_i$) is defined by the product of the number of pixels in a patch and the average intensity change of every pixel between two adjacent frames.

$$T_i = N \times \frac{1}{W \times H} \sum_{y=1}^{H} \sum_{x=1}^{W} |X_i(x, y) - X_{i-1}(x, y)| \qquad (2)$$

where $T_i$ is the threshold value for frame i and i−1, N is the number of pixels in a patch. W is the width of a frame and H is the height of a frame. X denotes the luminance value of a pixel.

The object is defined by the neighboring polygons that satisfy $|P_{i,j}-P_{k,l}|>$ threshold, where $P_{i,j}$, $P_{k,l}$ are the error sums for neighbor patches. Patches bound by a rectangle belong to an object represents the height and width of the objects. In other words, patches that share similar error values, eg values greater than 3 but less than 7, share a similar motion and may be presumed to correspond to the same object. More dynamic levels for the object can be defined which describe the dynamic component of the object by observing the patches $|P_{i,j}-P_{k,l}|<$ threshold where $P_{i,j}$, $P_{k,l}$ are patches within the object boundary. Single patches or small number of neighbors can be considered as noise or smaller object based on the applications or the source of the image sequences. If a line of patches runs along the edge of a frame, it may indicate a stabilization problem in the source of the images. For example, if all patches in a frame have a similar error, or apparent motion, then a possible source for the error may be a shaking of a camera, such as by an earthquake, explosion, unauthorized movement of the camera, instability due to wind or other unusual event. Thus, an unusual condition may be identified as occurring when an object size corresponds to the frame size. Upon detection of a stabilization problem in the source of the images or other unusual condition, the condition may be identified by various means such as an error message sent to a central controller, or the problem flagged by a coding on the frame data itself. If the stabilization indicator persists for a prolonged period, such as hours, the problem may be due to a continuous weather feature such as snow, which would be seen as a similar error across the entire frame and which persists from frame to frame. If the motion vectors change direction repeatedly, the image source may be swaying back and forth, such as in a windstorm.

The image can be coded as one unit or as a collection of object with a background. The background is defined as the patches that do not belong to any object. The speed of the background is defined as the majority of the motion of the nodes. To code a video object, we use the polygon using linked node list structure; we code the object as a binary frame using a predictive coding in addition to the mesh description. It may also be desirable to employ the mesh description in conjunction with a conventional compression technique such as DCT. Such an alternative streaming technique is described below in relation to FIGS. 18-21.

After having generated the final mesh topology, it is fairly straightforward to find that the smallest patches will focus on moving objects. The motion information of the smallest patches represents the movement of the objects. In order to combine the smallest patches to form individual semantically meaningful object, a connectivity neighborhood method is used and a dynamic level is generated as follows: For each patch:

Give the maximum level of dynamics $l_m$

Compute the deformed $p_{i,k}(p_{i,k+1})$, where each $p_i$ is a value of a pixel within a patch and k indicates from k (reference frame), k+1 indicates frame k+1 (current frame), hence $p_{i,k}$ is the patch on the reference frame, and $p_{i,k+1}$ is the warped patch using an affine transformation on the current frame If (threshold $(l_{i-1})<|p_{i,k}-p_{i,k+1}|<$threshold $(l_i)$)

Mark the patches and add it to the list $l_{i-1}$ as belonging to the same object For each patch repeat steps 2-4

This method relies on the spatial information of the patches. Sometimes the apparent motion due to the noise cannot always be removed using the threshold. The noisy pixels will form isolated clusters. To account for this, connected components smaller than a certain size are filtered out as noisy background. Thus the objects we are concerned with can be extracted. The global motion extraction is based on the local motion information of the smallest patches. In our context, we average the motion vectors of the patches. To compute the local motion vector of the patches, we apply the BM described above. In generating the procedure, the affine transformation is used to reconstruct the patches. The reconstructed patch is used to decide if a patch should be split or merged.

Affine Transformation

An affine transformation is an important class of linear 2-D geometric transformations, which map variables into another set of new variables by applying a linear combination of translation, rotation, scaling and/or shearing operations. The general affine transformation is commonly written in homogeneous coordinates as shown below:

$$\begin{bmatrix} x' \\ y' \end{bmatrix} = \begin{bmatrix} a_1 & a_2 \\ a_4 & a_5 \end{bmatrix} \begin{bmatrix} x \\ y \end{bmatrix} + \begin{bmatrix} a_3 \\ a_6 \end{bmatrix} \qquad (3)$$

where $a_i$, i=1, . . . , 6 designate the parameters of the affine model, the base coordinates (x, y) are transformed to produce the derived coordinates (x',y').

In order to save computational time, a multiplication-free affine transformation should be used instead of the traditional one. The affine parameters can be obtained by mapping the vertices of a triangle. Let $(x_1, y_1)$, $(x_2, y_2)$, $(x_3, y_3)$ denote the coordinates of the vertices of a triangle on the reference frame and $(x_1', y_1')$, $(x_2', y_2')$, $(x_3', y_3')$ denote their coordinates on the current frame. To compute the six affine parameters, we need the following equations:

$$a_1 = \frac{(x_1'-x_2')\times(y_1-y_3)-(x_1'-x_3')\times(y_1-y_2)}{(x_1-x_2)\times(y_1-y_3)-(x_1-x_3)\times(y_1-y_2)} \qquad (4)$$

$$a_2 = \frac{(x_1'-x_2')\times(x_1-x_3)-(x_1'-x_3')\times(x_1-x_2)}{(x_1-x_3)\times(y_1-y_2)-(x_1-x_2)\times(y_1-y_3)} \qquad (5)$$

-continued $$a_3 = \frac{(x'_1 x_2 - x'_2 x_1) \times (x_3 y_1 - x_1 y_3) - (x'_1 x_3 - x'_3 x_1) \times (x_2 y_1 - x_1 y_2)}{(x_2 - x_1)(x_3 y_1 - x_1 y_3) - (x_3 - x_1)(x_2 y_1 - x_1 y_2)} \quad (6)$$

$$a_4 = \frac{(y'_1 - y'_2) \times (y_1 - y_3) - (y'_1 - y'_3) \times (y_1 - y_2)}{(x_1 - x_2) \times (y_1 - y_3) - (x_1 - x_3) \times (y_1 - y_2)} \quad (7)$$

$$a_5 = \frac{(y'_1 - y'_2) \times (x_1 - x_3) - (y'_1 - y'_3) \times (x_1 - x_2)}{(x_1 - x_2) \times (y_1 - y_3) - (x_1 - x_2) \times (y_1 - y_3)} \quad (8)$$

$$a_6 = \frac{(y'_1 x_2 - y'_2 x_1) \times (x_3 y_1 - x_1 y_3) - (y'_1 x_3 - y'_3 x_1) \times (x_2 y_1 - x_1 y_2)}{(x_2 - x_1)(x_3 y_1 - x_1 y_3) - (x_3 - x_1)(x_2 y_1 - x_1 y_2)} \quad (9)$$

The above equations show that the original affine transformation needs numerous multiplication operations. In multiplication-free affine transformation, the computation of affine parameters can be simplified to the following relations:

$$a_1 = \frac{x'_2 - x'_1}{x_2 - x_1} \quad (10)$$

$$a_2 = \frac{x'_3 - x'_2}{y_3 - y_2} \quad (11)$$

$$a_4 = \frac{y'_2 - y'_1}{x_2 - x_1} \quad (12)$$

$$a_5 = \frac{y'_3 - y'_2}{y_3 - y_2} \quad (13)$$

To apply multiplication-free affine transformation, a temporary right-angled triangle is chosen with the lengths of the sides of the right triangle as powers of 2. The transformation of the two general triangles is done over two steps through the right-angled triangle. Because the patches we are using have 4+ edges, they can be split into triangles. This multiplication-free affine transformation is a new edition of the scan-line affine transformation; the parameters $a_3$ and $a_6$ are not needed. In the process of generating the topology, the motion vectors of the patch nodes are obtained at the same time, including the affine parameters of each patch that are needed to extract the global motion information. This greatly reduces the computational effort.

This technique can be used not only for connected regions labeling, but also for noise filtering. In case of significant noises, there will be disconnected regions all over the image. The result of eight-connectivity neighborhood method will be many isolated regions including both real moving objects and noises. By assigning a threshold of size, the small regions representing noises could be filtered out:

If Size[object(i)] > T
   A video object (keep it)
Else
   Noise (discard it)    (14)

where size[object(i)] calculates the size of $i^{th}$ object, and T is the threshold, the value of which depends on the average object size that should be known in advance.

Feature Point Extraction

Feature points, also referred to as tracking points, are selected from the moving object and used for tracking in the video sequence. Corner detection methods can provide good result of feature points on an image. If there is only one object in the image and the background is clear, the corner detector can produce reliable output. But if the background is textured and more than one object is present, it is hard to decide which detected point belongs to an object and which one belongs to the background. In this embodiment, we use motion cues together with corner detection to give satisfactory results. While there are several kinds of different corner detection methods in the literature, this embodiment employs the Susan corner detector because it's efficient and easy to use.

Motion Tracking

Tracking in our work is achieved using affine motion model, a method which takes advantage of the viewpoint invariance of single image features and the collective temporal coherence of a cloud of such features, without requiring features to exist through entire sequences. Furthermore, affine motion model also provides tolerance to features appearing at and disappearing from the edge of the image as a wider or narrower view is taken. In case of difficulty caused by the temporal instability of a single corner of an object, where a single tracking point may fade from time to time, an object may be tracked by a less rigorous constraint such as tracking any three tracking points assigned to the object. Hence, if an object is defined by 6 tracking points, A, B, C, D, E and F, the algorithm might track the object by tracking any three of the points across successive frames.

Because scaling is an affine transformation, the method is fundamentally invariant to zoom, rotation, shape changes and general difformation. Moreover, because the method allows corners to disappear and appear, and because the gaze points are not tied to a physical feature, it appears to solve the other problem introduced by zooming.

The proposed algorithm adopts point-based method using affine transfer for tracking. This proposed algorithm is different from the other point-based tracking methods in that it tracks not only the gaze point, but also the size of the target. The feature points detection is performed only when the correlation of the affine basis set between previous and current frame is less than a threshold. This results in reduction of computational cost.

While tracking an object undergoing a linear transformation, its position could be represented by the center of an object, which will be used as the gaze point to control the movement of the camera. Centroid is usually calculated to be the object center, and the contour of moving object is usually used to compute the size of the object. However, the calculation of centroid and contour is time-consuming. the proposed algorithm uses object boundary box to represent the size of an object, and the center of object boundary box to replace the centroid.

Figure 7:
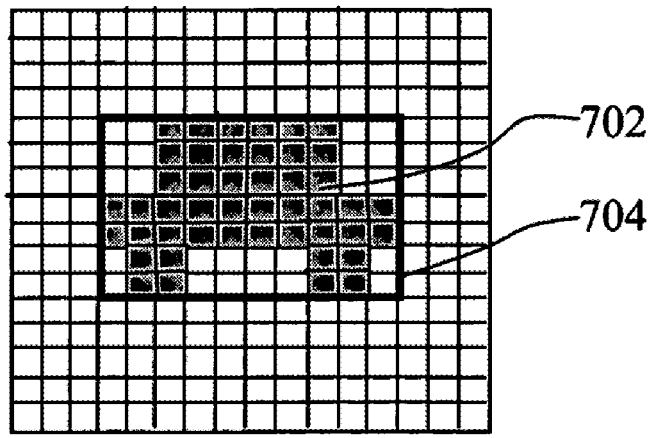
FIG. 7 shows the detection of an object boundary.

As described above, the region of the moving object is selected to be a rectangle to speed up the operation. The changed blocks will be connected to form objects according to the rule of connectivity. Then the maximum object boundary box can be formed. The idea is shown in FIG. 7. The aim of our smart tracking system is to track the size and position of a moving object 702. The object size could be represented by the size of maximum object boundary box (OBB) 704, and the object position could be located by the center of OBB, which we name it as gaze point. The object boundary box itself could be represented by its four corners: object boundary points. So only four points are needed to represent the object size.

Figure 9:
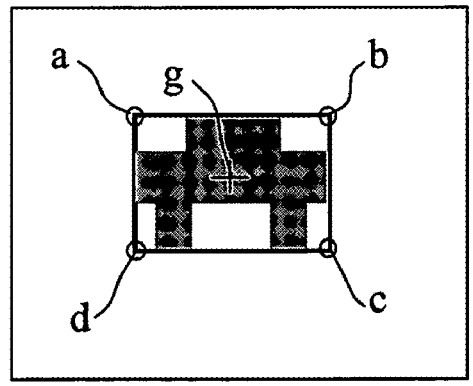
FIG. 9 an example of boundary points and a gaze point assigned to an object.

Referring to FIG. 9, when the object is detected, the boundary box can be located, and corner detection is performed within the boundary box. Three points are selected from the corner points, which will act as the affine basis points, aff1$_r$, aff2$_r$, and aff3$_r$. Meanwhile, the locations of gaze point [g$_r$] and the 4 corner points of the boundary box [a$_r$, b$_r$, c$_r$, d$_r$] are recorded, and they will be reconstructed in the following frames. If the three affine basis points are matched in the next frame as aff1$_c$, aff2$_c$ and aff3$_c$, the affine parameters can be computed, and the new position of the gaze point [g$_c$], and the new object boundary points [a$_c$, b$_c$, c$_c$, d$_c$] can be produced. Then in the third frame, a short time later, the affine basis points are tracked again and the affine parameters are computed again to reconstruct new object boundary points and gaze point. Neither the gaze point nor the object boundary points need to correspond to any physical features, they are all virtual points. Thus with any three corner correspondences (on the detected moving object) in two frames, we can reconstruct the positions of the desired points given their image coordinates in the previous frame. The three affine basis points need not to be the same over time, they will be abandoned if their correlation between 2 frames are less than the predefined threshold, and a new affine basis set will be selected. By using this method, there are only 3 corner points that will be tracked in every frame, and only 5 virtual points will be reconstructed to decide the object position and size.

Figure 8:
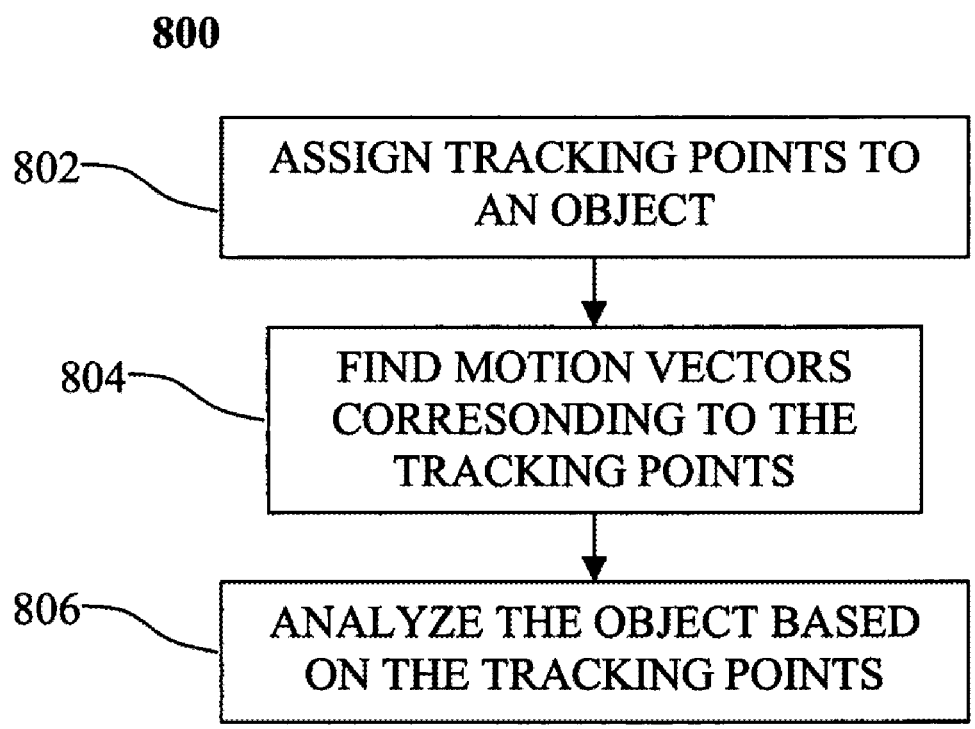
FIG. 8 is a flow diagram showing a method of analyzing an object.

The method 800 of analyzing an object using tracking points will now be summarized with reference to FIG. 8. Once the mesh has been established according to the procedure in FIG. 1, tracking points are assigned to an object, such as to the corners of the rectangle in step 802. For simplicity, tracking points are generally allocated around the boundary of the object. Motion vectors corresponding to the tracking points are found in step 804, and the object is analyzed based on the tracking points in step 806. Analysis may include, for example, monitoring movement of the object which may include calculating the velocity of the object from the motion vectors, or object identification, which may be accomplished using the size of the objects as defined by the tracking points.

Affine Basis Set Selection

Figure 10:
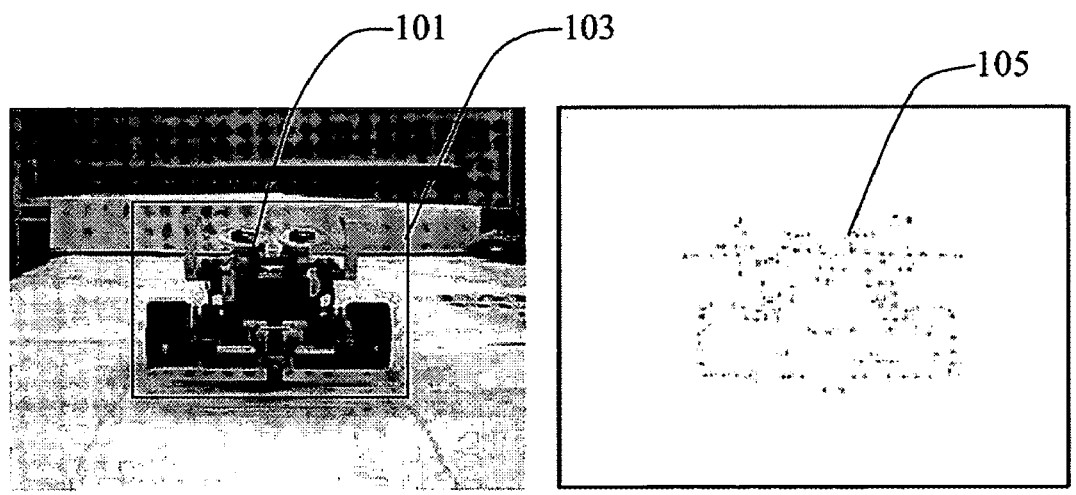
FIG. 10 is an example detecting corners of an object.

Corners appear to be ideal features to provide information of the targets. However, there are still some problems we will have to face. One of the problems is: which point is most relevant? The proposed algorithm only extracts corner points within the object boundary box, which already partly solved this problem, but there will still be a small portion in the object boundary box that contains the background. The proposed algorithm currently uses a technique based on corner velocity: it is assumed that the background is stationary and the target is moving, and there is only one moving object in the field of view. Every candidate corner point will be estimated for its velocity between frame t$_1$ and frame t$_2$. If its velocity is zero, it will be filtered out as a background corner. FIG. 10 shows that some background corners are detected together with the object's feature points, where the actual image with an object 101 inside object boundary 103 is shown in the right frame, and the detected corners 105 of the object 101 are shown in the left frame. Taking into account the corner velocity, this problem should be solved.

Figure 11:
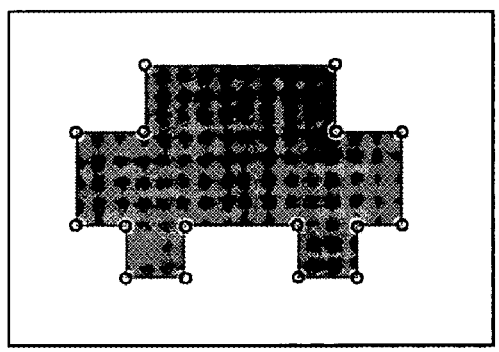
FIG. 11 is an example of selecting different affine basis sets from feature points.
Figure 11:
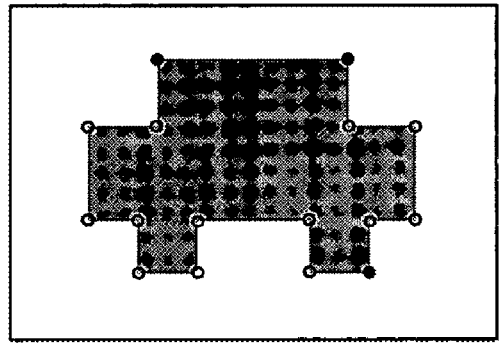
Figure 11:
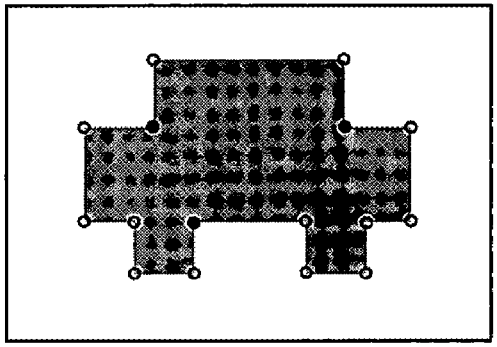
Figure 11:
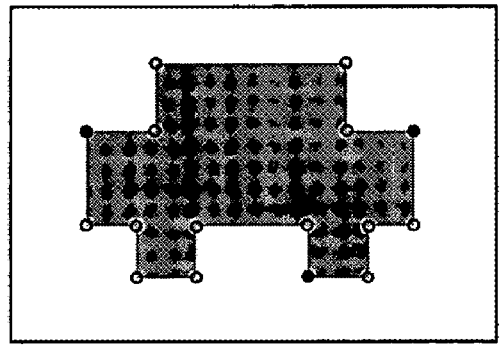

The second and considerably more important problem is that while tracking an individual corner, it may be only stable in a few frames. Either noise or occlusion will inevitably cause it to disappear sooner or later. The possibility of fixating the tracking on any individual corner is ruled out. Individual corner disappearing and reappearing will significantly affect the affine tracking result. A possible solution is to use a more sophisticated control strategy. We select individual corners to be affine basis point, and switch from one set to another set when they disappear. FIG. 11 shows this idea. The black solid circles are the affine basis points, and other circles are feature points the figure shows the different point set selection.

A rapid stable selection of affine basis set can be made by automatically choosing the left and right most feature points on the moving object, and then choosing the third point that maximizes the area of the triangle defined by the three points.

Figure 12:
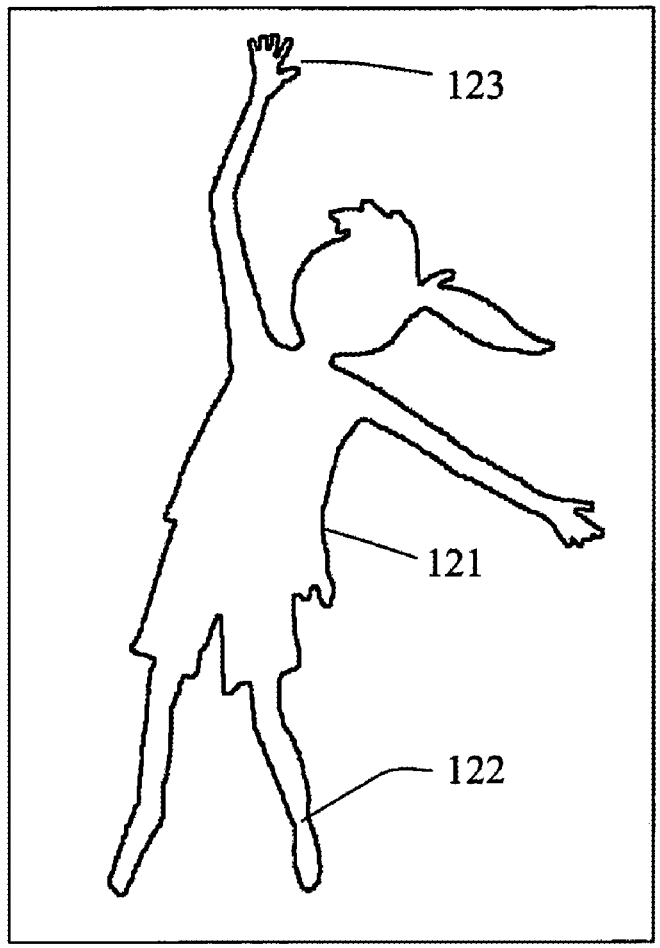
FIG. 12 is an example showing detecting of body outline in the presence of moving features of the body.

The third and the most difficult problem is in case of tracking a non-rigid object like an active person such as a person involved in a sport. For example, while tracking a human such as the human shown in FIG. 12, with one arm raised and in motion, if we just randomly select 3 points from all the feature points detected on the moving person to be the affine basis points, the selected points may be on one leg or arm, which mould not represent the global motion of the person and may obtain wrong prediction results. So we must set some constraints for the selection of the feature points.

Head and feet motions of a person involved in a sport may be the most suitable to represent the global motion of the person. The constraints should be set to locate the 3 selected affine basis points on head and feet. Locating the feet is not difficult. We can do that by limiting the searching area to be around the lower left and right corner of the detected object boundary. But for the head, the situation may be more complex. If the arm of the person is raised, and moving, the head is not always the top. To select the tracking points, the person is first detected as a set of contiguous patches having similar motion vectors. Lower right and left corners of the detected object are identified as feet. The head is then selected as the top most point near the middle of the object, which can be detected using various techniques, such as taking the different between left and right halves of the object. The projection of the head will remain the extreme point even if it's actually not the uppermost part of the body. Hence, depending on the object being tracked, constraints may be required to track the object.

Once an object has been defined by tracking points, various observations may be made of the object and interpreted according to assumptions that depend on the scene. For example, in transport monitoring, two smaller objects merging as one larger object moving may be identified as a collision between vehicles. A smaller object in a street scene may be identified as a bicycle, while a very large object may be defined as a truck. To estimate velocity of an object, the average of the motion vectors of a patch may be converted into an absolute velocity using a calibration of the scene, for example each pixel might correspond to 1 meter in the scene.

Motion Estimation of Feature Points

Figure 13:
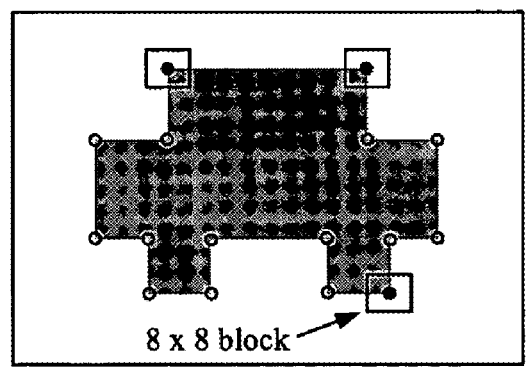
FIG. 13 is an example of the motion estimation of affine basis points.

The affine basis set will be tracked in every frame to generate different affine parameters. There are several kinds of conventional motion estimation algorithms, such as Three Step Search (TSS), Full Search, Cross Search, and Optical Flow. As stated before, motion estimation algorithms rely on the fundamental idea that the luminance (s) of a point P on a moving object remains constant along P's motion trajectory. As before, the motion vectors (MV) of the affine basis points are estimated by generating an 8×8 block of pixels surrounding the point as shown in FIG. 13, and the motion estimation method is applied on the whole block to generate the motion vector. The motion vector (MV) of the object can be calculated as:

$$MV(x,y) = g_c(x_c, y_c) - g_r(x_r, y_r) \quad (16)$$

where $g_c(x_c, y_c)$ is the coordinate of the gaze point on the current frame,
and $g_r(x_r, y_r)$ is the coordinate of the gaze point on the reference frame.

Tracking the Object

Figure 14:
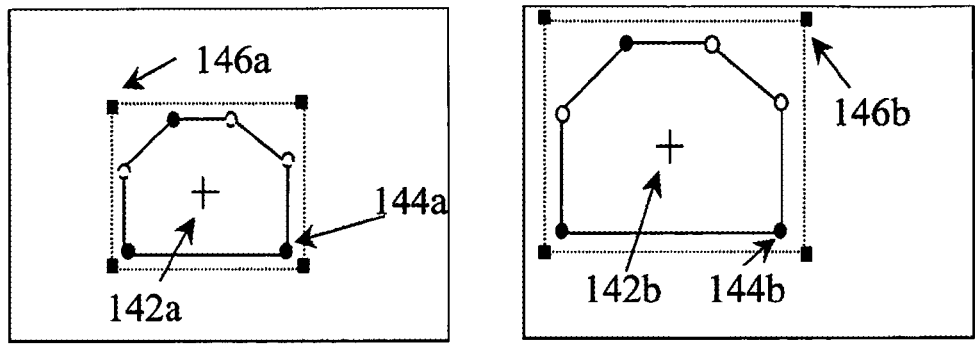
FIG. 14 is an example of affine object tracking.

After finding the affine basis set on the next frame, affine parameters are acquired, then the new location of the object (the gaze point) and the new size of the object (object boundary points) can be reconstructed, which is shown in FIG. 14, showing frame 1 in (a), and frame 2 in (b), where gaze point 142a is replaced by new gaze point 142b, affine basis point 144a is replaced by affine basis point 144b, and object boundary point 146a is replaced by 146b Unlike other tracking methods such as correlation matching, this method is viewpoint invariant, and will work even if the fixation point is occluded. As long as the affine basis are matched between frames, the gaze point and object boundary points can always be reconstructed.

Figure 15:
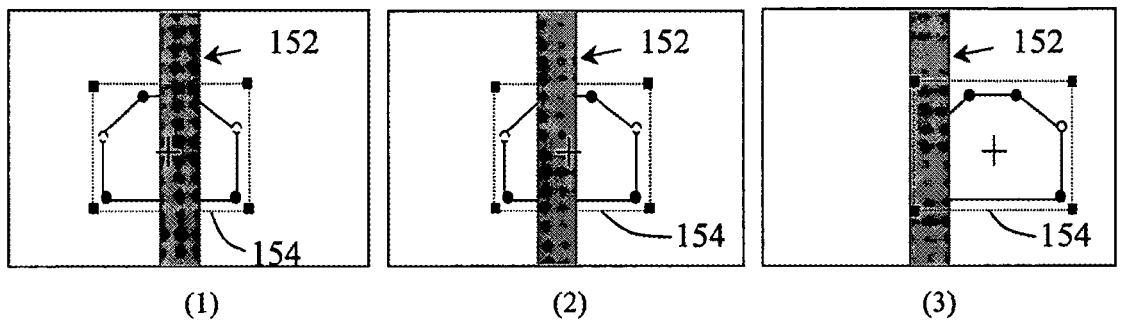
FIG. 15 is an example of changing an affine basis set due to an occlusion.

From FIG. 15 we can see that, when there is a partial occlusion 152, which may not be in the same location relative to object 154 between frames (1), (2), and (3), the current affine basis points can not be tracked on the next frame, so the proposed algorithm will reselect a new affine basis set. The gaze point and object boundary points need not to be visible, they can be reconstructed even though the corresponding physical object points are occluded.

A Real-Time Implementation System

Figure 16:
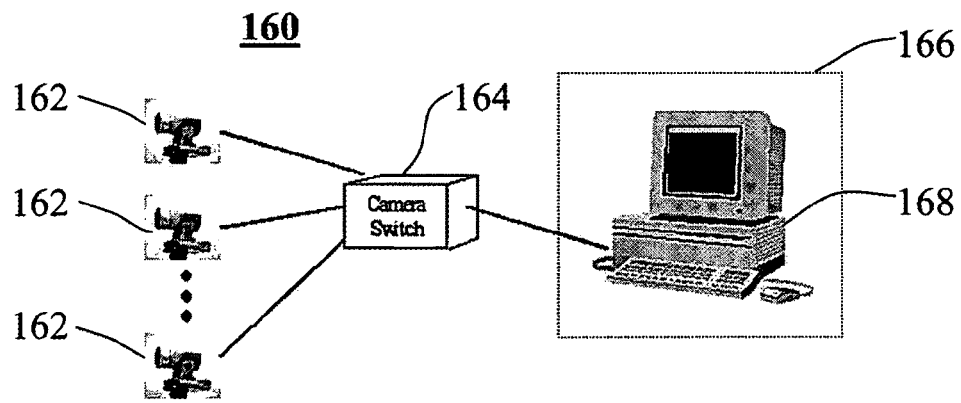
FIG. 16 is a system for implementing the algorithms.

The proposed algorithm is implemented using an apparatus, as shown in FIG. 16, comprising an active video camera system 162 for acquiring successive frames of data, a camera switch 164, and a data processor 166 comprised of a video capture card (not shown) and a personal computer 168 or a special computer board for processing the successive frames of data.

A camera coordinate system is used to represent image pixels. Each pixel in an image frame taken by VCC4 camera can be defined as $(x,y,\alpha,\beta,\delta)_{Fi}$, x and y represent the image pixel location (the (0,0) point of the coordinate is the center of the whole image), $\alpha$ is pan angle, $\beta$ is tilt angle, and $\delta$ is the zoom setting.

The camera is first set to a default setting, and begins to do foreground segmentation. If there is any moving object appears within the camera's current field of view, it will be detected and tracked. The object gaze point is set to be the camera gaze point (the center of the image). During the presence period of this object, the gaze point is predicted from frame to frame by affine motion model (this will be discussed in detail later). The camera is controlled to follow the detected gaze point to keep the moving object in the center of the camera's field of view. Assume current location of the object gaze point is already the camera gaze point, it could also be represented by CENTER (0, 0), and $(x_{i+1}^P, y_{i+1}^P)$ be the predicted location of the gaze point on the next frame, the new camera setting could be computed as follow:

Pan position $\alpha_{i+1}=\alpha_i+f(\delta)*(x_{i+1}^P-\text{CENTER}_x)$

Tilt position $\beta_{i+1}=\beta_i+f(\delta)*(y_{i+1}^P-\text{CENTER}_y)$

Figure 17:
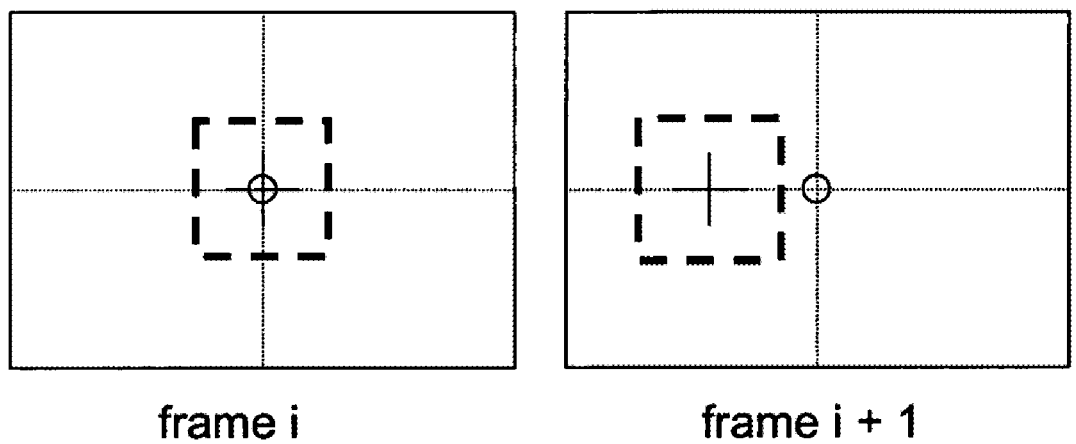
FIG. 17 is an example of camera position control.
Figure 18:
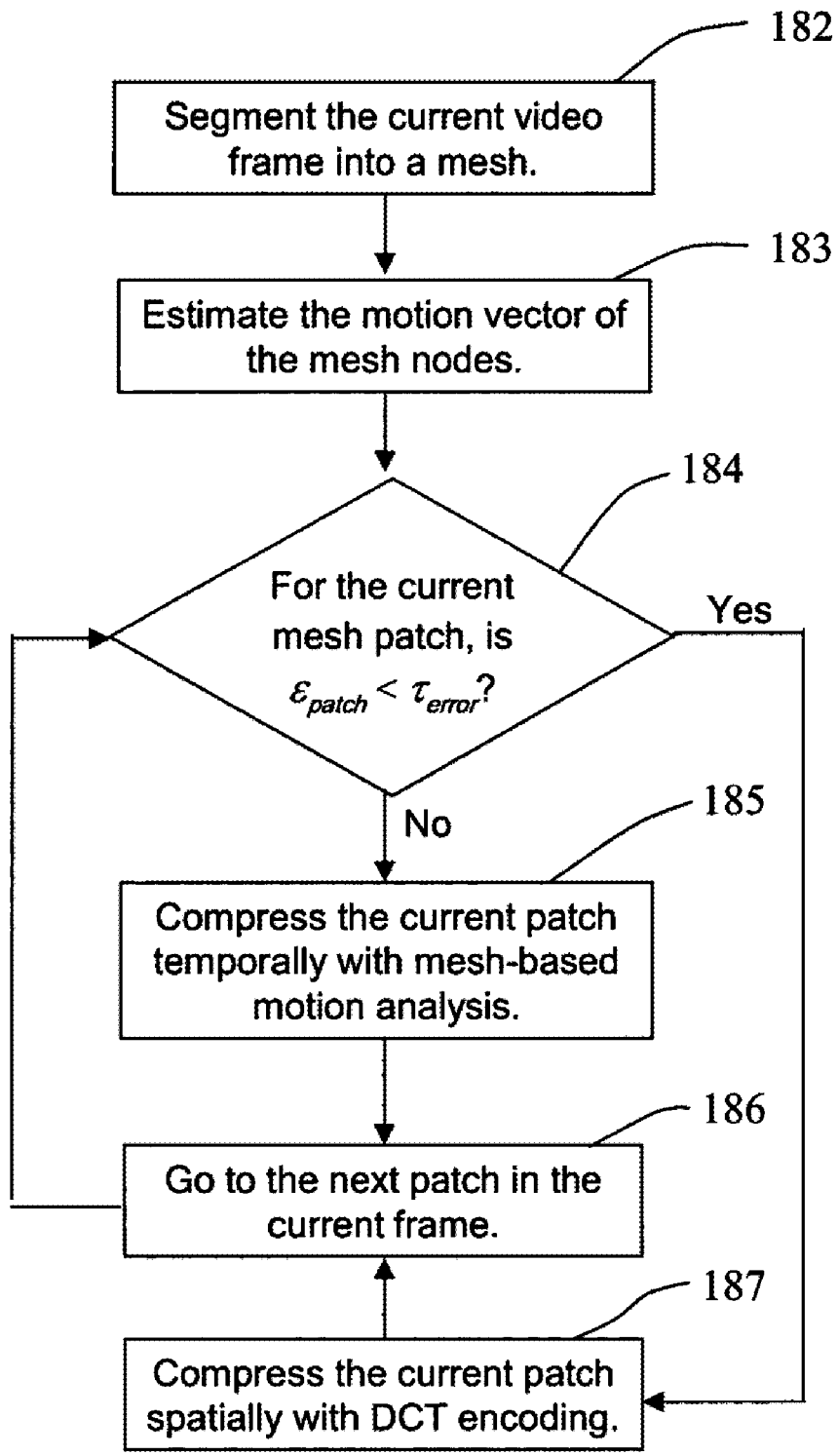
FIG. 18 is a flow diagram showing a process of reconstructing error detection process.

Zoom position $\delta_{i+1}=\delta_i$ (3.1)

where $\alpha_{i+1}$, $\beta_{i+1}$, $\delta_{i+1}$ represent the new camera location. $f(\delta)$ is the pan/tilt angle factor under zoom setting $\delta$. The new object gaze point will be the center of the next image after the camera moves to the new pan, tilt and zoom position. Since we first deal with the pan/tilt control, the zoom setting is assumed to be constant in frame i and frame i+1. This is shown in FIG. 17. The cross represents the object gaze point, the circle represents the cameral gaze point CENTER (0, 0). In frame i, the object gaze point and the camera are overlapped. In frame i+1, they are in different image locations. The purpose of pan/tilt control is to force them overlap again.

The zoom operation is performed when the detected moving object is too small or too large. Object will be zoomed in or out to the desired size. The object boundary is predicted by affine motion model, and then the size of the predicted object will be calculated and compared with the desired object size. If the difference ratio exceeded a predefined limitation, the new zoom setting will be computed, and the camera will be controlled to zoom into the new setting to hold the object in its field of view. Let $S_d$ be the desired object size after zooming, and $S_{i+1}$ be the predicted object size on the next frame, the new zoom setting is calculated as follow.

$$\delta_{i+1} = \delta_i + g\left(\frac{S_d}{S_{i+1}}\right) \quad (3.2)$$

where $\delta_i$ is the previous zoom setting, and $\delta_{i+1}$ is the new zoom setting.

$$g\left(\frac{S_d}{S_{i+1}}\right)$$

is the function used to transfer size ratio into zoom steps.

The camera switch has eight video input and one output. It is controlled by the computer's parallel port to switch between 8 cameras, so the target can be tracked from different point of view.

A Hybrid Coding Approach

The proposed hybrid coding approach is consisted of three main operations: reconstruction error detection, mesh node reduction, and bit stream encoding. In this section, all three operations are described in detail. The procedure that is used to reconstruct video frames encoded from the hybrid approach is also discussed.

For the first operation in the proposed hybrid coding approach, reconstruction error detection, a regular 2D uniform mesh initially needs to be created for the current video frame and the motion vector for all the mesh nodes need to be estimated. Then, the magnitude of the reconstruction error ($\epsilon_{patch}$) for each square-sized patch in the mesh is evaluated by applying the affine transform procedure to reconstruct each mesh patch and comparing the absolute difference between the pel values of the reconstructed patch and those in the original frame. Mathematically, $\epsilon_{patch}$ is expressed as follows:

$$\varepsilon_{patch} = \sum_{i=i_o}^{i_o+N} \sum_{j=j_o}^{j_o+N} |C'_{i,j} - C_{i,j}|, \quad (1)$$

where $C_{i,j}$ refers to original pel values, $C'_{i,j}$ refers to reconstructed pel values, $(i_o, j_o)$ refers to the starting position of the patch, and N refers to the patch dimension (i.e. mesh node spacing). If the $\epsilon_{patch}$ of a patch is higher than a predefined reconstruction error threshold ($\tau_{error}$), then the patch is considered as inappropriate for mesh-based motion analysis and DCT encoding will be introduced to spatially compress the patch. On the other hand, if $\epsilon_{patch}$ is below $\tau_{error}$, then the patch is described using the mesh-based motion analysis model. The complete reconstruction error detection process is summarized in the flowchart shown in FIG. 18. In step 182, the frame is segmented into a mesh, and in step 183, motion vectors of the mesh nodes are estimated. A patch by patch analysis is then commenced. If $\epsilon_{patch}$ is below $\tau_{error}$ in step 184, then we proceed to step 187, where the patch is spatially compressed with DCT encoding. If not, the current patch is temporally compressed with mesh-based motion analysis in step 185. In both cases, analysis moves to the next patch in the current frame in step 186, and the process returns to step 184.

Figure 19:
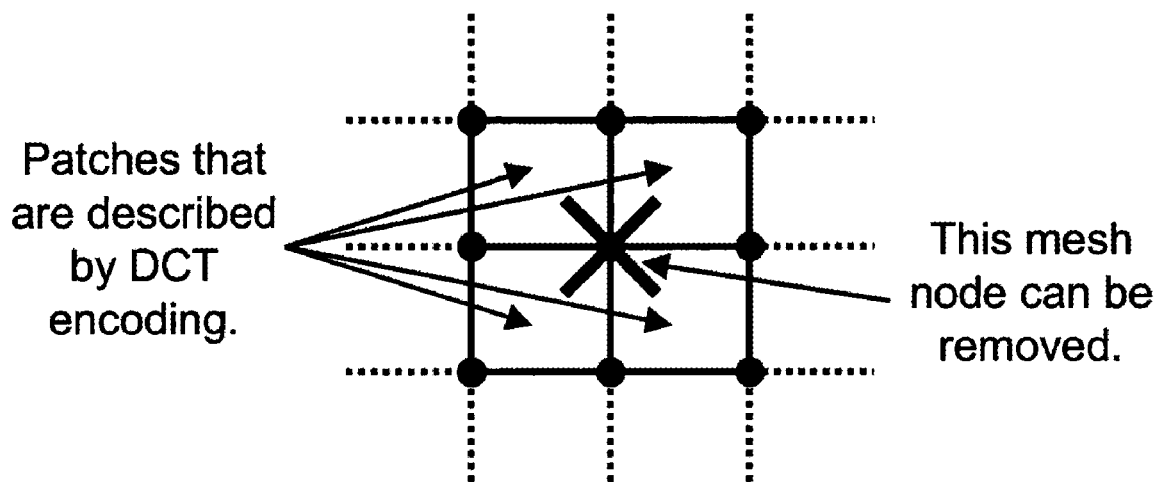
FIG. 19 shows the condition for mesh node removal.
Figure 20:
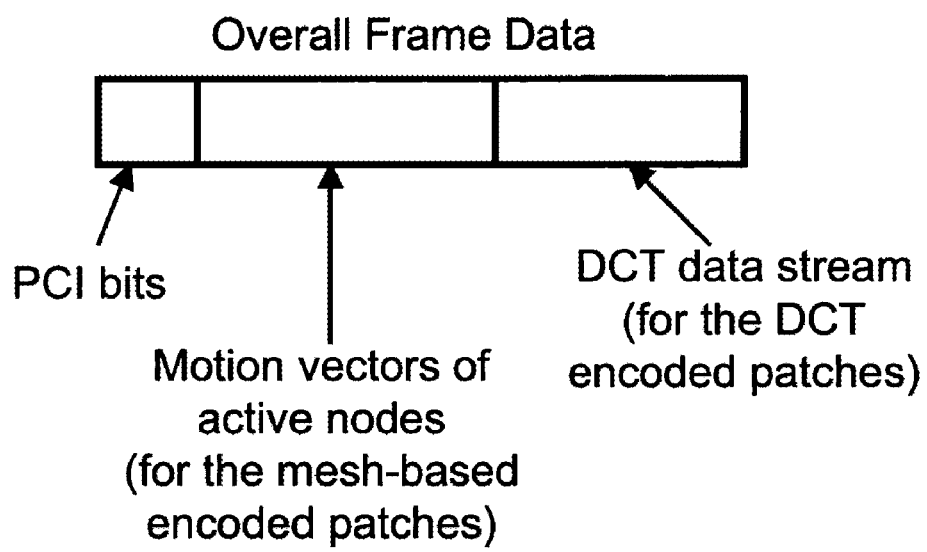
FIG. 20 shows the data stream structure of the hybrid coding approach.

After the reconstruction error detection process has been completed, the mesh node reduction operation can be carried out. The purpose of this operation is to remove the nodes of those patches that are not described by the mesh-based motion analysis model (i.e. those compressed by DCT encoding), so that the compressed data stream of mesh-based motion analysis can be minimized during bit stream encoding. However, as illustrated in FIG. 19, since most mesh nodes, except for the boundary ones, belong to more than one patch, a mesh node cannot be deleted unless all the patches that it belongs to are compressed by DCT encoding. Otherwise, the mesh node must remain in the mesh.

Since mesh-based motion analysis and DCT encoding are both used during the inter-frame coding process, the video codec must describe which method is used to compress each patch in the frame. An effective way to depict this information is to encode an overhead bit, which may be called a "patch compression identification" bit (or PCI bit), for each patch prior to the streaming of data from mesh-based motion analysis and DCT encoding. In particular, if mesh-based motion analysis is used to describe the patch, an asserted PCI bit is encoded; conversely, if DCT encoding is used to compress the patch, an unasserted PCI bit is encoded.

Figure 21:
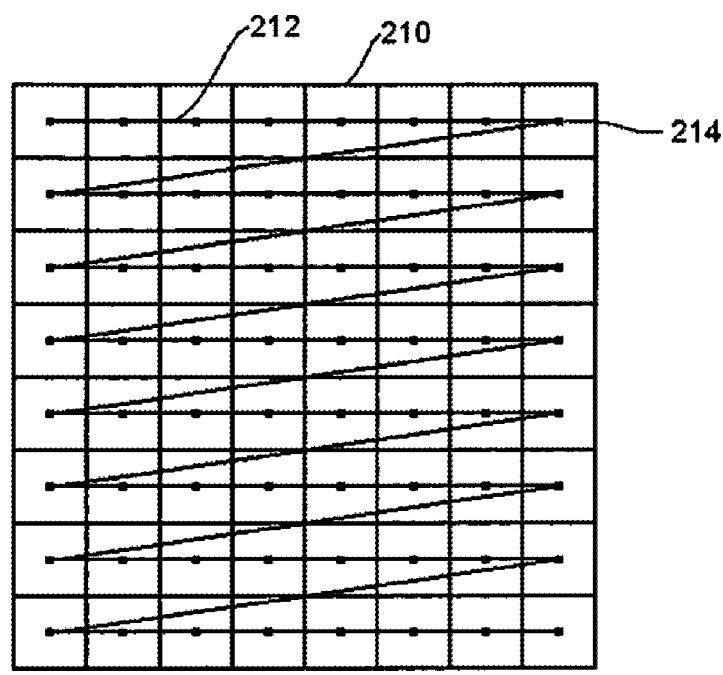
FIGS. 21-24 show various frame processing orders.

After all the PCI bits are encoded, the motion vector of the active nodes in the mesh and the encoded DCT data can be streamed. The resulting structure of the overall data stream in the hybrid coding approach, as shown in FIG. 21, is thus composed of a combination of PCI bits, motion vectors, and DCT encoded patches. Note that the streaming of PCI bits prior to the streaming of motion vectors and encoded DCT data is necessary so that the video codec can anticipate for the correct number of motion vectors and DCT encoded patches during decoding.

During decoding, the PCI bits are first read in from the hybrid encoded data stream. Based on the location of the asserted PCI bits in the data stream, the decoder can then determine the number of motion vectors and DCT encoded patches to read in from the hybrid data stream. If mesh-based motion analysis is used to describe a patch, then the motion vectors of all the nodes that belong to the patch are required. Once all the motion vectors and DCT encoded patches have been obtained, the video frame can be reconstructed on a patch-by-patch basis. Specifically, for patches that are described by mesh-based motion analysis, their contents are recovered by using the affine transform to spatially warp the pel values from the reference frame. Otherwise, their contents are reconstructed from inverse DCT.

When considering the order used to process the polygonal patches, it is useful to consider the order to be a space-filling curve. By using a space-filling curve, a two-dimensional space may be processed in a linear manner. The space-filling curve is a line that visits each patch of the mesh. However, it never intersects itself, and visits each patch only once. To maintain the visiting order, the space-filling curve numbers the patches in the order they are visited, with the order starting at zero for convenience. While any line that visits the grid cells of the mesh in some order can be used as a space filling curve, there are some desirable properties for a space-filling curve:

The space-filling curve should preserve spatial proximity. The patches close to each other in the space should be close to each other in the order scheme imposed by the space filling curve, although it is accepted that there is no order scheme that completely preserves spatial proximity; i.e., we can never guarantee that patches close to each other in the mesh will always be close to each other in the ordering. The path has two free ends and it visits every cell exactly once without crossing itself. The space-filling curve has a recursive development. To derive a curve of order i, each vertex of the curve is replaced by the curve of order i−1. The space-filling curve should be simple to compute. The space-filling curve should be able to be constructed for any size of the space.

Figure 22:
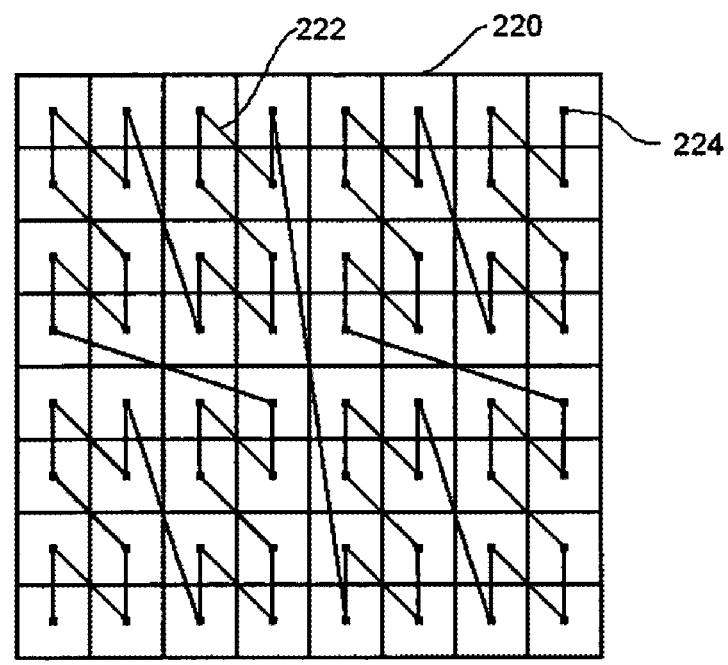
Figure 23:
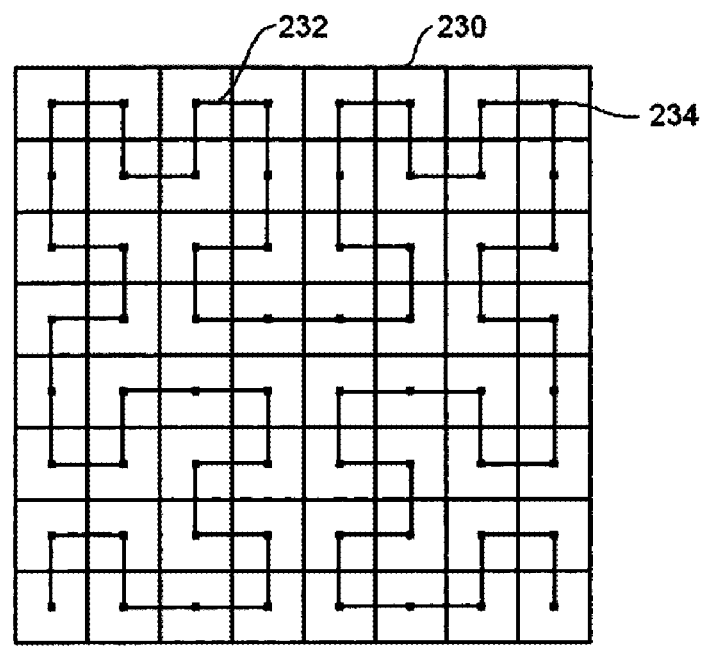
Figure 24:
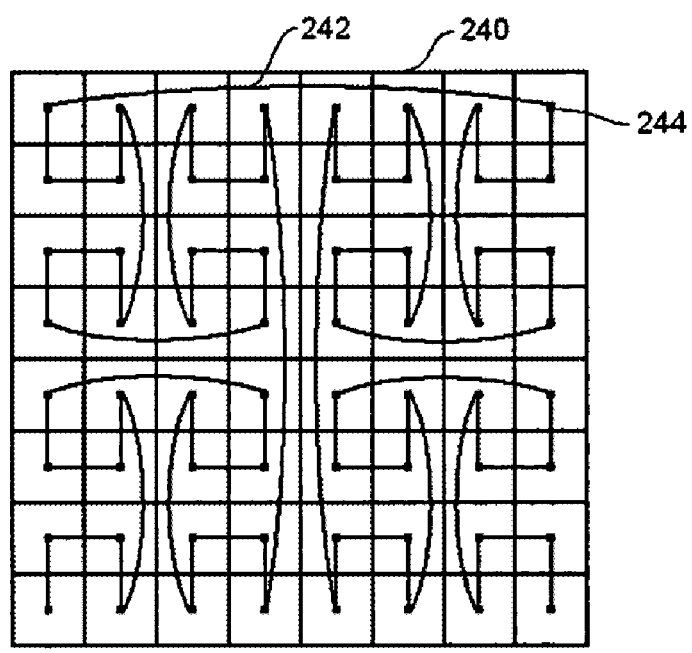

Referring now to FIG. 21, there is shown a space-filling curve which follows the row-major order. While simple to compute, it does not preserve spatial proximity, and is inappropriate for the present application. The most common orders are shown in FIGS. 22 (the Z-order), 23 (the Gray order), and 24 (the Hilbert order). In FIGS. 21 through 24, 210, 220, 230, and 240 represent the individual patches (squares in these examples); 212, 222, 232, and 242 represent the curve; and 214, 224, 234, and 244 represent the vertices that are reached for each patch 210, 220, 230 and 240. Due to the simplicity of computing the Z-value (Morton code), the Z-order is widely used in data indexing applications. The Z-value of a grid cell is computed by interleaving the bits of the binary representation of its x and y coordinates of the grid cell. In the Gray order, as described for example in Christos Faloutsos "Gray codes for partial match and range queries", IEEE Transactions on Software Engineering, 14(10):1381-1393, October 1988, to get a cell's corresponding code, the bits of the Gray code of the z and y coordinates of a patch are interleaved. The Hilbert order is a continuous ordering, as described, for example, in David J. Abel and David M. Mark, "A comparative analysis of some two dimensional ordering" Int. Journal of Geographical Information Systems, 4(1):21-31, 1990, which means that any two consecutive numbers in the order will correspond to two adjacent patches in the mesh. The Hilbert curve is not simple to compute. The computing method of the Hilbert curve is described in Nicklous Wirth, Algorith+Data Structure+Programs, Prentice-Hall, Englewood Cliffs, N.J., 1976. and C. Faloutsos, S. Roseman "Farcticals for Secondary Key Retrieval", Proc. of the ACM Conf. on the Principle of Database Systems, 1989, 247-252. Several comparative studies show that the Z-order and the Hilbert order are the most suitable for use in spatial access methods. The Hilbert order usually out-performs the Z-order (as shown in previously mentioned references) from the point of view of preserving spatial proximity. However, due to the complexity in computing the Hilbert curve, we are interested in the Z-curve.

Figure 25:
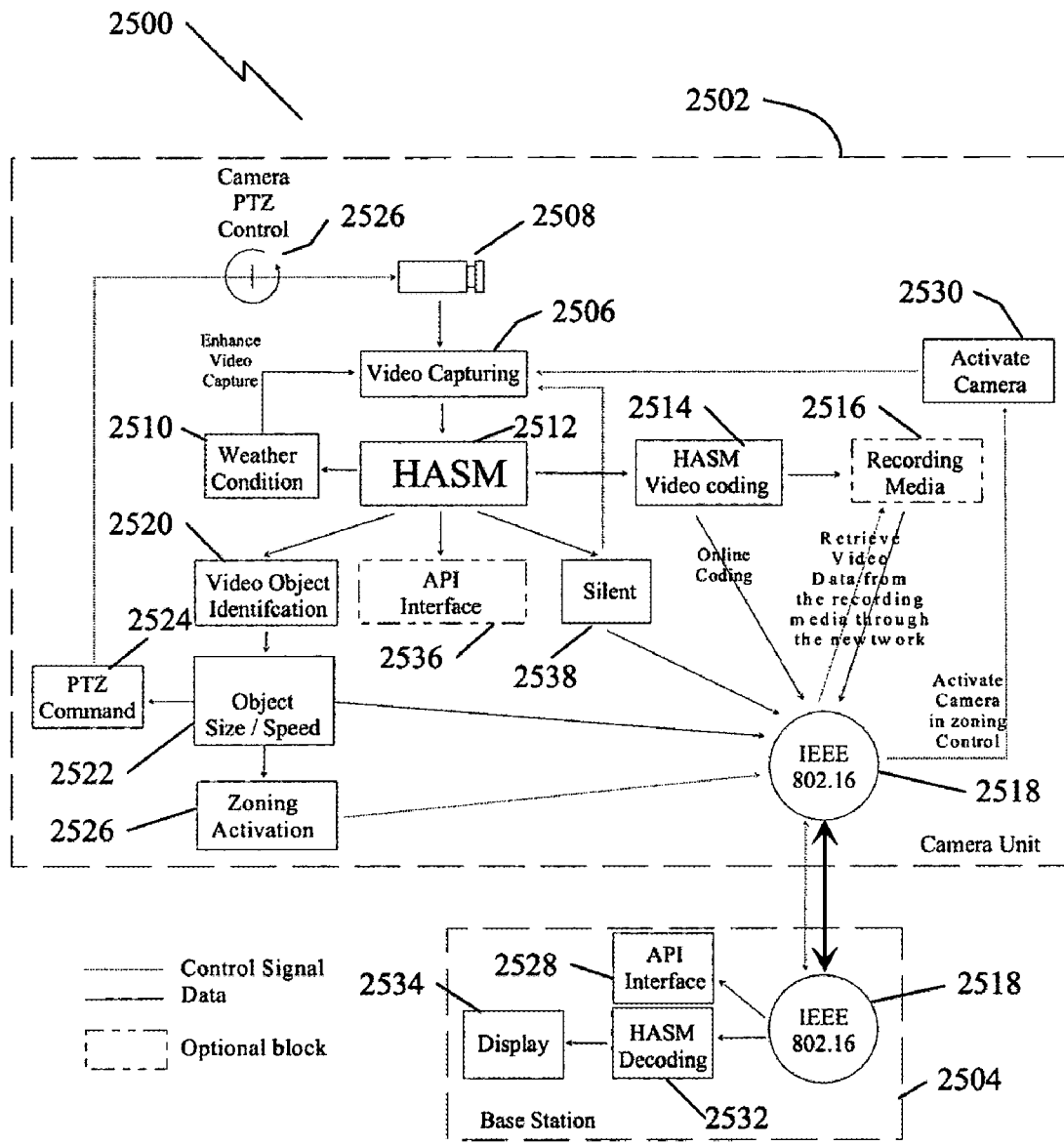
FIG. 25 is a schematic showing an example architecture for implementing an embodiment of the invention.

FIG. 25 illustrates how the present invention and the IEEE 802.16 WiMAX standard for Wireless Metropolitan Area Networks work together in an embodiment 2500 of the invention. The teachings of the present invention provide the camera portion 2502 a high degree of local intelligence, thereby freeing-up communications servers 2518 that are monitoring hundreds of cameras. In FIG. 25, the acronym HASM, referring to Hierarchical Adaptive Structure Mesh is used to represent the teachings of this invention. The embodiment is ideal for a traffic monitoring system, which will be the application considered below.

As video is captured in block 2506 by camera 2508, it is analyzed by HASM block 2512 and block 2510 for conditions such as low light-levels, snow, rain or wind that may require image enhancement. The video is coded by block 2514 and recorded to recording media 2516 such as flash memory or can be transmitted to a server 2518 using the IEEE 802.16 standard, for real-time viewing. The coding will allow 24 hours of video to be compressed on a 256M flash memory card in recording media 2516. The camera 2502 can then download this sequence on demand in the event that a hard recording of an accident or other incident is required, whereas current ITS systems must be wired directly to a recording device at the server. In block 2520, an object can be identified, and size and speed information can be extracted in block 2522 in order to track the object by controlling the camera pan/tilt/zoom (PTZ) in blocks 2524 and 2526. In addition, in block 2526, zoning can be activated to hand the camera off to another camera as the object moves from one camera's field of view to the next. An Applications Programming Interface (API) 2528 allows the camera 2502 to communicate to a third party application for other local systems such as traffic signal control. The camera can turn itself off or be activated by block 2530 on command by the user. The IEEE 802.16 WiMAX network operates on unlicensed spectrum with a range of 50 kilometers. One base station 2504 can handle thousands of cameras since the primary tasks are control related. Streaming video can be decoded by HASM in block 2532 for real-time viewing by an operator on a display 2534. An API interface 2536 also allows integration with third party ITS applications. Also, block 2538 indicates whether the HASM 2512 is silent.

Embodiment Features

An advantage of this embodiment is that one module can be designed for both fixed and PTZ cameras. A basic system may include such features as basic monitoring and analysis, signal control, incident recording and networking. New features, such as vehicle tracking, red light enforcement, system-level control, etc., can be added later via software upgrades that can be obtained, for example, by downloading them over the network. The following table defines possible basic and expanded features:

| Basic Features | Fixed Intersection Camera | Highway PTZ Camera |
| --- | --- | --- |
| Monitoring & analysis | X | X |
| Incident recording | X | X |
| Wireless network | X | X |
| Image enhancement | X | X |
| Signal control | X | |
| Expanded Features | | |
| System-level control | X | |
| Vehicle tracking | | X |
| Zoning | | X |
| Enforcement | X | |

Monitoring and analysis can include traffic volume, density, lane occupancy, classification of vehicles, or road conditions in a lane. Signal control can include the presence of vehicles approaching or waiting at an intersection, queue length measurement by lane, and a NEMA, or other standard, signal controller interface. Incident recording can include 24 hours of in-camera recording, memory contents that can be overwritten or downloaded over a network for 24.7 coverage, one recording device at a server for all cameras, and remote access for the in-camera recording. The wireless network can include technology related to the 802.16 wireless network, or an integration of 4 cameras with 802.11 and each intersection with 802.16. In addition any number of cameras may be selected for real-time monitoring, where hundreds of cameras can be managed for both control and compressed video download, video download is available by sequentially polling cameras and downloading memory, (eg. 256 Mb at 30-50 Mb/s), and there is centralized camera lane-programming.

Applications

This invention has applications wherever video information is processed such as in video coding including in video coders and decoders, videophones, video conferencing, digital video cameras, digital video libraries, mobile video stations and video satellite communication; bio technology including diagnostics, high throuhgputs, robotics surgery, water quality monitoring, drug discovery and screening; surveillance including personal identification, remote monitoring, hazardous condition identification, transportation vehicle tracking and enhanced traffic control; robotics including higher performance and throughput; military applications including, high speed target tracking & guidance, unmanned vehicle landing; entertainment including toys that can see and interact; interactive biometrics; industrial applications including dynamic inspection and video communication in plants; entertainment video; digital cameras and camcorder; enhanced video conferencing; smart boards for video cameras; stabilizers for video cameras and video projectors.

In the claims, the word "comprising" is used in its inclusive sense and does not exclude other elements being present. The indefinite article "a" before a claim feature does not exclude more than one of the feature being present. A "data point" as used in this disclosure and the claims means an intensity value of a signal received by a detector, such as a video camera. The detector will typically be a two dimensional array of detector elements, in which case the data point will correspond to a sample from one of the detector elements at the sample rate of the element. However, the detector may also be a one-dimensional array operated in a push-broom fashion. An "anchor point" is a location having an x value and a y value in a two dimensional frame. An anchor point need not coincide with a data point.

Immaterial modifications may be made to the embodiments of the invention described here without departing from the invention.

What is claimed is:

1. A method of processing sequential frames of data, the method comprising repeating the following steps for successive frames of data:
   acquiring with a video camera at least a reference frame containing data points and a current frame of data points; and
   processing the at least a reference frame and a current frame in a data processor by;
   identifying a set of anchor points in the reference frame, where the distribution of anchor points is based on texture of the reference frame;
   assigning to each anchor point in the reference frame a respective motion vector that estimates the location of the anchor point in the current frame;
   defining polygons in the reference frame, each polygon being defined by anchor points;
   assigning tracking points to at least one object represented in the reference frame, each object being formed by one or more polygons and each tracking point corresponding to a feature of the object; and
   analyzing the object using the tracking points.

2. The method of claim 1 in which analyzing the object comprises identifying the object.

3. The method of claim 2 in which the object is identified using the size of the object as defined by the tracking points.

4. The method of claim 1 in which analyzing the object comprises monitoring movement of the object.

5. The method of claim 4 further comprising computing the velocity of the object.

6. The method of claim 1 in which the tracking points are allocated around the boundary of the object.

* * * * *